(12) United States Patent
Senda et al.

(10) Patent No.: US 8,612,117 B2
(45) Date of Patent: Dec. 17, 2013

(54) APPARATUS FOR CONTROLLING THE AMOUNT OF WASTE HEAT OF AN ENGINE

(75) Inventors: Takashi Senda, Aichi-ken (JP); Mitsuo Hara, Ichinomiya (JP); Hiroaki Takeishi, Oobu (JP); Daisuke Nakanishi, Aichi-ken (JP); Hisashi Iida, Kariya (JP)

(73) Assignee: Denso Corporation, Kariya (JP)

( * ) Notice: Subject to any disclaimer, the term of this patent is extended or adjusted under 35 U.S.C. 154(b) by 631 days.

(21) Appl. No.: 12/814,681

(22) Filed: Jun. 14, 2010

(65) Prior Publication Data

US 2011/0004392 A1   Jan. 6, 2011

(30) Foreign Application Priority Data

Jun. 12, 2009  (JP) .................................. 2009-141676
Sep. 30, 2009  (JP) .................................. 2009-225829
May 17, 2010  (JP) .................................. 2010-113326

(51) Int. Cl.
*F02D 28/00*   (2006.01)

(52) U.S. Cl.
USPC .......................................... 701/103; 60/320

(58) Field of Classification Search
USPC ............ 701/103, 105, 102, 101; 60/320, 600, 60/612; 123/406.44, 406.45, 568.11, 123/90.15, 90.19
See application file for complete search history.

(56) References Cited

U.S. PATENT DOCUMENTS

| 5,293,741 | A  | 3/1994 | Kashiyama et al. |
| 6,334,431 | B1 | 1/2002 | Kanehiro et al. |
| 6,789,512 | B2 | 9/2004 | Duvinage et al. |
| 2004/0055283 | A1 | 3/2004 | Iihoshi et al. |
| 2005/0235971 | A1* | 10/2005 | Klingebiel et al. ...... 123/568.11 |
| 2010/0251703 | A1* | 10/2010 | Takeishi et al. ................. 60/320 |
| 2011/0197853 | A1* | 8/2011 | Takeishi et al. .......... 123/406.45 |

FOREIGN PATENT DOCUMENTS

| JP | 02-096476 | 8/1990 |
| JP | 04-044849 | 10/1992 |
| JP | 05-059936 | 3/1993 |
| JP | 05-215000 | 8/1993 |
| JP | 11-324746 | 11/1999 |
| JP | 2000-240547 | 9/2000 |
| JP | 3255066 | 11/2001 |
| JP | 2004-116310 | 4/2004 |

(Continued)

OTHER PUBLICATIONS

U.S. Appl. No. 13/027,577, Takeshi et al, filed Feb. 15, 2011.

(Continued)

*Primary Examiner* — Hieu T Vo
(74) *Attorney, Agent, or Firm* — Nixon & Vanderhye P.C.

(57) ABSTRACT

An apparatus is provided for application to a waste heat reuse system that recovers and reuses engine waste heat, and for controlling the amount of waste heat based on a requested heat amount of a heat utilization request. In the apparatus, an overlap angle between a valve-opening period of an intake valve and that of an exhaust valve of the engine is controlled based on an engine driving condition. Ignition timing of the engine is controlled to fall on maximum-efficient timing that minimizes fuel consumption in a current engine driving condition. When a requested heat amount cannot be satisfied, overlap-increase control is performed to increase an overlap angle, and ignition advance control is performed to advance ignition timing with reference to a maximum-efficient timing that corresponds to the increased overlap angle. Waste heat amount of the engine is controlled with the overlap-increase control and the ignition advance control.

22 Claims, 20 Drawing Sheets

(56) References Cited

FOREIGN PATENT DOCUMENTS

| | | |
|---|---|---|
| JP | 2005-127230 A | 5/2005 |
| JP | 2007-162494 | 6/2007 |
| JP | 2009-013932 | 1/2009 |
| JP | 2011163323 A * | 8/2011 |

OTHER PUBLICATIONS

Japanese Office Action dated Jan. 10, 2012, issued in corresponding Japanese Application No. 2009-225829 with English Translation.
Office Action (2 pages) dated May 14, 2013, issued in corresponding Japanese Application No. 2010-113326 and English translation (2 pages).

* cited by examiner

AT THE TIME HEAT UTILIZATION REQUEST IS ISSUED

AT THE TIME HEAT UTILIZATION REQUEST IS CANCELLED

APPARATUS FOR CONTROLLING THE AMOUNT OF WASTE HEAT OF AN ENGINE

CROSS-REFERENCE TO RELATED APPLICATION

This application is based on and claims the benefit of priority from earlier Japanese Patent Applications No. 2009-225829 filed on Sep. 30, 2009, No. 2009-141676 filed on Jun. 12, 2009, and No. 2010-113326 filed on May 17, 2010, the description of which is incorporated herein by reference.

BACKGROUND OF THE INVENTION

1. Technical Field of the Invention

The present invention relates to an apparatus for controlling the amount of waste heat of an engine, which apparatus controls an amount of waste heat of an engine based on a request for utilizing heat.

2. Related Art

An engine installed in a vehicle generates combustion energy when fuel is combusted. The combustion energy includes lots of heat energy other than kinetic energy used for traveling of the vehicle. Heating of a vehicle cabin, warming-up of a catalyst, and the like are performed using this heat energy. For example, there is a well-known configuration in which the waste heat of an engine included in the engine cooling water is recovered and heating is performed utilizing the recovered waste heat.

There is also a well-known method of controlling combustion energy as disclosed in JP-A-H05-215000 and JP-A-H05-059936. According to this control, the ignition timing and the valve on-off timing of the intake/exhaust valves are controlled during the engine operation. The amount of waste heat of the engine is increased under this control to accelerate warming-up of the engine and the catalyst.

However, there is a concern that change of ignition timing and valve timing for increasing the amount of waste heat of an engine may deteriorate the fuel consumption of the engine. In this regard, the controlling method described in the above patent documents does not take account of the deterioration in the fuel consumption accompanying the change of ignition timing, and the like. Therefore, from the viewpoint of fuel-consumption performance, this method may not necessarily be an optimum method as a means for increasing the amount of waste heat of an engine.

Further, there is another well-known method of controlling combustion energy as disclosed in JP-A-H11-324746. According to this control, similar to the above control, the ignition timing and the valve on-off timing of the intake/exhaust valves are controlled to thereby raise the temperature of the exhaust gas. Thus, the catalyst can be warmed up at an earlier stage.

However, the change of ignition timing and valve timing to increase the amount of waste heat of an engine may cause abrupt change of the engine torque. Therefore, there is a concern that the drivability may resultantly be deteriorated.

SUMMARY OF THE INVENTION

The present invention has been made to solve the problems set forth above and has a first object of providing a waste heat control apparatus for an engine, which is able to perform waste heat control in conformity with a request for utilizing heat (heat utilization request), while suppressing deterioration in the fuel consumption. Further, the present invention has a second object of providing a waste heat control apparatus for an engine, which is able to perform waste heat control in response to a heat utilization request and reduce shock, for example, caused when control is switched according to a requested amount of heat.

The present invention has adopted the following configuration in order to achieve the first object mentioned above.

The present invention relates to a waste heat control apparatus for an engine, which apparatus is applied to a waste heat reuse system that recovers and reuses waste heat of an engine and which controls a waste heat amount of the engine based on a requested heat amount of a request for utilizing heat (heat utilization request). According to a mode of the present invention, the apparatus is characterized in that the apparatus comprises: overlap angle control means that controls an overlap angle between a valve-opening period of an intake valve and a valve-opening period of an exhaust valve of the engine based on an engine driving condition; ignition timing control means that controls ignition timing of the engine at maximum-efficient timing when minimum fuel consumption is achieved in each engine driving condition; and waste heat control means that performs overlap-increase control under which the overlap angle is increased and ignition advance control under which the ignition timing is shifted to an ignition advance side with reference to the maximum-efficient timing that corresponds to the overlap angle after being increased, in the case where the requested heat amount cannot be satisfied.

In performing waste heat control in response to a heat utilization request, it is desirable that deterioration in fuel consumption due to the decrease of engine operating efficiency is suppressed as much as possible. The inventors of the present invention earnestly studied the relationship between engine driving condition, engine waste heat amount and fuel-consumption performance. As a result, it has been found that fuel consumption is more improved as a valve overlap angle becomes larger and that fuel consumption is more improved by controlling ignition timing to fall on an ignition advance side rather than on an ignition retard side with reference to an optimum ignition timing MBT. With these improvements, a desired amount of engine waste heat can be recovered using engine cooling water. Accordingly, as in the above configuration, when a requested heat amount cannot be satisfied, an overlap angle may be changed in an increasing manner and ignition timing may be shifted to an ignition advance side with reference to maximum-efficient timing (MBT or near MBT) that corresponds to the overlap angle after being changed in an increasing manner. Thus, waste heat control can be appropriately performed in response to a heat utilization request, while fuel consumption can be suppressed from being deteriorated as much as possible.

An overlap angle may be changed by changing the valve-opening period of an intake valve or by changing the valve-opening period of an exhaust valve. Alternatively, both of the valve-opening period of the intake valve and that of the exhaust valve may be changed in changing the overlap angle.

Specifically, according to a preferred embodiment, as the overlap-increase control, the overlap angle may be controlled to an overlap angle with which fuel consumption of the engine at ignition timing that satisfies a predetermined engine waste heat amount in ignition timing characteristics of each overlap angle is made smaller than fuel consumption before increase of overlap angle, and as the ignition advance control, the ignition timing may be controlled according to the requested heat amount so as to fall on an ignition advance side with reference to the maximum-efficient timing that corresponds to the overlap angle after being changed in an increasing manner. Alternatively, according to another preferred embodiment, as the overlap-increase control, the overlap angle may be controlled to an overlap angle with which fuel consumption of the engine at maximally-ignition-advanced timing in ignition timing characteristics of each overlap angle is made smaller than fuel consumption before increase of an overlap angle. According to still another preferred embodiment, as the overlap-increase control, the overlap angle may be controlled to an overlap angle with which a waste heat amount of the engine at maximally-ignition-advanced timing in ignition timing characteristics of each overlap angle is made smaller than a waste heat amount before increase of an overlap angle. Thus, an overlap angle can be favorably set, whereby increase of generated heat in the engine waste heat can be balanced with suppression of deterioration in the fuel consumption.

In ignition timing characteristics of each overlap angle, there is a correlation between an overlap angle with which fuel consumption of an engine at ignition timing that satisfies a predetermined engine waste heat amount becomes smaller than the fuel consumption before the increase of the overlap angle, and an overlap angle with which fuel consumption of the engine when ignition timing is permitted to fall on to maximally-ignition-advanced timing becomes smaller than the fuel consumption before the increase of the overlap angle. These overlap angles substantially coincide with each other. In this case, since maximally-ignition-advanced timing of ignition timing has already been known (since maximally-ignition-advanced timing is uniformly determined when an overlap angle is determined), calculation of an overlap angle is simplified by performing waste heat control based on the maximally-ignition-advanced timing.

When an overlap angle is changed in an increasing manner, ignition timing is required to be advanced in conformity with the increase of the overlap angle, in order that fuel-consumption performance is maintained. Thus, according to another preferred embodiment, as the ignition advance control, the ignition timing may be controlled based on a first ignition timing correction amount for advancing the ignition timing from maximum-efficient timing before increase of an overlap angle to maximum-efficient timing after increase of an overlap angle, and a second ignition timing correction amount for advancing the ignition timing from the maximum-efficient timing that corresponds to an overlap angle after being increased, according to the requested heat amount.

Preferably, according to another embodiment, as the overlap-increase control, the overlap angle may be changed to a maximally-overlapped angle having a maximum value in a range that can be set, and, as the ignition advance control, the ignition timing may be controlled according to the requested heat amount so as to fall on an ignition advance side with reference to the maximum-efficient timing that corresponds to the maximally-overlapped angle. As a result of the study made by the inventors, it has been found that, when an engine waste heat amount is to be increased, a larger overlap angle can more suppress the deterioration in the fuel consumption.

At ignition timing, an ignition advance limit is set for the purposes of avoiding the occurrence of knocking, limiting the generation timing of a pressure peak in a cylinder, and the like. Therefore, when ignition timing is shifted to an ignition advance side according to a requested heat amount, a recoverable engine waste heat amount may be restricted by the ignition advance limit of the ignition timing. On the other hand, when an engine waste heat amount is to be further increased, it is desirable from a viewpoint of fuel-consumption performance to reduce, as much as possible, a change amount for an overlap angle that minimizes the fuel consumption of an engine at maximally advanced ignition timing, i.e. it is desirable to increase an overlap angle as much as possible. The inventors of the present invention have paid attention to the following processes for increasing an engine waste heat amount, while suppressing deterioration in the fuel-consumption performance. Specifically, in the case where ignition timing is controlled to fall on an ignition advance side with reference to maximum-efficient timing, the engine waste heat amounts are maximized at the maximum ignition timings in the respective overlap angles. Further, in the case where the engine waste heat amount is compared between different overlap angles at the maximally-ignition-advanced timings, the engine waste heat amount at the maximally-ignition-advanced timing of each overlap angle becomes larger as the overlap angle is smaller.

Specifically, according to another preferred embodiment, there are provided: first control means that controls, as the overlap-increase control, the overlap angle to a maximally-efficient overlap angle that minimizes fuel consumption of the engine in the case where the ignition timing is permitted to fall on maximally-ignition-advanced timing that is an ignition advance limit, and controls, as the ignition advance control, the ignition timing according to the requested heat amount so as to fall on an ignition advance side with reference to maximum-efficient timing that corresponds to the maximally-efficient overlap angle; and second control means that controls the overlap angle to an overlap angle smaller than the maximally-efficient overlap angle, and controls the ignition timing so as to fall on maximally-ignition-advanced timing that corresponds to an overlap angle after being changed, wherein control is switched between waste heat control performed by the first control means and waste heat control performed by the second control means, based on the requested heat amount. According to the present configuration, with the waste heat control of the first control means, the waste heat control can be performed with optimum fuel consumption. Also, with the waste heat control of the second control means, a requested heat amount can be satisfied while fuel-consumption performance can be suppressed from being deteriorated as much as possible. Thus, according to the present invention, suppression of the deterioration in the fuel consumption and a heat utilization request can both be satisfied with a good balance therebetween.

The above configuration is specifically described. For example, when a requested heat amount can be satisfied by the heat generation of the first control means, the waste heat control may be performed by the first control means. When a requested heat amount cannot be satisfied by the heat generation of the first control means, the waste heat control may be performed by the second control means. Thus, waste heat control suitable for a heat utilization request can be favorably performed, and at the same time, fuel consumption can be suppressed from being deteriorated as much as possible.

Specifically, the waste heat control with the second control means is performed establishing a relationship that an overlap angle is permitted to be smaller as a requested heat amount becomes larger, or a relationship that the ignition timing is permitted to fall more on an ignition retard side as the requested heat amount becomes larger.

When a heat utilization request is issued, ignition timing may not be controlled to fall on an ignition advance side with reference to maximum-efficient timing, depending on the engine driving condition of the moment. In this case, ignition timing is shifted to an ignition retard side with reference to the maximum-efficient timing in order to increase a waste heat amount. In this regard, from a viewpoint of fuel-consumption performance and according to another preferred embodiment, it is desirable that the apparatus includes ignition advance margin determining means that determines whether or not there is an ignition advance margin in which the ignition timing is controlled to fall on an ignition advance side with reference to the maximum-efficient timing; and, when the requested heat amount cannot be satisfied, performs waste heat control with the waste heat control means in the case where an ignition advance margin for the ignition timing is determined to be present by the ignition advance margin determining means, and changes the overlap angle in an increasing manner and shifts the ignition timing to an ignition retard side with reference to the maximum-efficient timing in the case where no ignition advance margin is determined to be present by the ignition advance margin determining means.

Further, in order to achieve the second object set forth above, the present invention provides the following configuration.

The apparatus for controlling waste heat of an engine of the present invention is characterized in that the apparatus comprises: waste heat control means in which multiple control modes are set with different heat efficiency characteristics of an engine being imparted thereto; and mode switching means that delays switching of the control modes for issuance timing or cancellation timing of the heat utilization request in switching the control modes, so that a waste heat amount of the engine is increased or decreased based on the heat utilization request.

With the above configuration, the heat efficiency characteristics of an engine will be differentiated by performing switching between the multiple control modes. This will lead to the realization of the waste heat control of an engine according to each heat utilization request. Also, regarding switching between the multiple control modes, the timing of mode switching is delayed for issuance timing or cancellation timing of a heat utilization request. Therefore, unlike the configuration in which mode switching is performed immediately after the issuance or cancellation of a heat utilization request, mode switching will not be performed until maturation of a favorable condition where control mode can be switched according to each heat utilization request. As a result, waste heat control suitable for a heat utilization request can be carried out, and in addition, shock or the like can be mitigated at the time of performing control switching that accompanies the change of a requested heat amount.

In fact, heat efficiency is an index that indicates how much of the heat energy produced by the combustion of an engine has been converted to engine output (effective work), and thus is also referred to as engine operating efficiency. Heat efficiency characteristics refer to engine control characteristics for realizing predetermined heat efficiency in engine control. Different heat efficiency characteristics will affect the engine waste heat amount even when the engine driving condition remains unchanged.

According to a preferred embodiment, heat efficiency characteristics of the multiple control modes are set for each operating region of an engine, and switching of the control modes is performed in an operating region of an engine, in which region the heat efficiency characteristics remain the same or substantially remain unchanged before and after switching of the control modes.

With the present configuration, at the time of the issuance or cancellation of a heat utilization request, if an operating region of an engine does not correspond to a region where heat efficiency characteristics become the same or substantially remain unchanged before and after the switching of control mode, control mode will not be switched until the operating region is transited to such an operating region. In this case, since control mode is switched at appropriate timing during the operation of an engine, shock or the like that accompanies control switching can be mitigated.

To supplement the explanation, in the control with different heat efficiency characteristics of an engine, a basic controlled variable (such as ignition timing or valve timing) of the engine is rendered to be different, or a correction amount of the controlled variable of the engine is rendered to be different, for example. Accordingly, when heat efficiency characteristics are changed at the time of switching control mode, torque variation or the like will be caused with the change of a final controlled variable of the engine. In this regard, the above configuration will not allow change of heat efficiency characteristics at the time of switching control mode, or, if change is allowed, the change is limited to a slight change, whereby torque variation or the like that accompanies mode switching can be mitigated.

According to another preferred embodiment, heat efficiency characteristics of two or more control modes are permitted to be the same in any one of the operating regions of an engine. Switching of the control modes is performed between control modes having the same heat efficiency characteristics, in an operating region where heat efficiency characteristics of two or more control modes become the same after issuance or cancellation of the heat utilization request.

With the present configuration, heat efficiency characteristics will not be changed at the same time with the switching of control mode, but heat efficiency will be the same before and after the switching. Thus, torque shock or the like that accompanies the change of heat efficiency characteristics can be mitigated.

To supplement this, there may be a configuration that includes an operating region where heat efficiency characteristics of two or more control modes become the same and an operating region where heat efficiency characteristics of multiple control modes are different from each other. In the configuration, after the issuance or cancellation of a heat utilization request, control mode switching may be performed after waiting for the latter operating region (operating region where heat efficiency characteristics of multiple control modes are different from each other) of the two operating regions to be transited to the former operating region (operating region where heat efficiency characteristics of two or more control modes become the same).

In a high-load region of an engine, the amount of generated heat of the engine is large. Therefore, it is considered that a sufficient waste heat amount can be ensured without the necessity of particularly changing the heat efficiency (in other words, without the necessity of increasing the engine waste heat amount on purpose) to thereby satisfy each heat utilization request. Accordingly, in a high-load region of an engine, two or more control modes of the multiple control modes are allowed to have the same heat efficiency characteristics. In this case, according to another preferred embodiment, heat efficiency characteristics of two or more control modes of the multiple control modes are the same in a high-load region of an engine, and switching of the control modes may be performed in the case where an engine driving condition resides in the high-load region.

Thus, since heat efficiency characteristics will again not be changed at the time of switching control mode, torque variation or the like that accompanies mode switching can be suppressed. It should be appreciated that, desirably, engine heat efficiency is maximized in a high-load region of an engine.

According to another preferred embodiment, a first operating region provided as an execution region for one control mode of the multiple control modes, and a second operating region provided as an execution region for two or more control modes of the multiple control modes are set as operating regions adjacent to each other. Switching of the control modes is performed according to the heat utilization request at timing when an engine driving condition is transited from the first operating region to the second operating region or at timing when an engine driving condition is transited from the second operating region to the first operating region, after issuance or cancellation of the heat utilization request.

To explain briefly, at the time of switching control mode with the issuance of a heat utilization request, the switching timing is limited to transition timing of: first operating region→second operating region, or to transition timing of: second operating region→first operating region. Specifically, at the time of issuance or cancellation of a heat utilization request, control mode switching will not be performed until the engine driving condition is transited from the first to second operating region or vice versa. In this case, control mode switching accompanying the heat utilization request is performed not in the second operating region for executing two or more control modes, but performed in conformity with the transition to and from (moving in and out of) the first operating region for executing a single control mode. Thus, heat efficiency characteristics can be allowed to be the same, or heat efficiency characteristics can substantially be prevented from being changed, before and after the control mode switching. In this case, the two or more control modes to be executed in the second operating region have different heat efficiency characteristics, and therefore torque variation may occur when control mode is switched in the second operating region. In this regard, such torque variation can be suppressed by switching control mode in conformity with the transition to and from the first operating region.

Regarding the two or more control modes having the second operating region as an execution region, the second operating region near the boundary with the first operating region may bear engine output characteristics that continuously change in relation to the first operating region. Thus, heat efficiency characteristics can substantially be prevented from being changed before and after the control mode switching to thereby enable smooth control mode switching.

As described above, since the amount of generated heat is large in a high-load region of an engine, it is considered that a sufficient waste heat amount can be ensured without the necessity of particularly changing the heat efficiency (in other words, without the necessity of increasing the engine waste heat amount on purpose) to thereby satisfy each heat utilization request. Accordingly, a high-load region can be set as the first operating region (execution region for a single control mode of the multiple control modes). Specifically, according to another preferred embodiment, a high-load region of an engine may be the first operating region and a region where load is lower than in the high-load region may be the second operation region.

Thus, in switching control mode, the occurrence of torque variation can be suppressed as well. It is desirable that engine heat efficiency is maximized in a high-load region of an engine.

In increasing an engine waste heat amount, it is desirable that deterioration in the fuel consumption due to the lowering of engine heat efficiency is suppressed as much as possible. The inventors of the present invention earnestly studied the relationship between engine driving condition, engine waste heat amount and fuel-consumption performance (heat efficiency). As a result, it has been found that fuel consumption is more improved (heat efficiency can be suppressed from lowering as much as possible) as a valve overlap angle becomes larger and that fuel consumption is more improved (heat efficiency can be suppressed from lowering as much as possible) by controlling ignition timing to fall on an ignition advance side rather than on an ignition retard side with reference to an optimum ignition timing MBT. With these improvements, a desired amount of engine waste heat can be generated.

Thus, according to another preferred embodiment, overlap-increase control is performed, under which the overlap angle is changed in an increasing manner, and ignition advance control is performed, under which the ignition timing is shifted to an ignition advance side with reference to the maximum-efficient timing (MBT or near MBT) that corresponds to an overlap angle after being changed in an increasing manner, in at least any one of multiple control modes. Thus, a waste heat amount suitable for a heat utilization request can be generated, and at the same time, the engine heat efficiency of the moment can be suppressed from lowering as much as possible. This is favorable from the viewpoint of fuel consumption.

The inventors have found that, when ignition timing is controlled to fall on an ignition advance side with reference to maximum-efficient timing, an engine waste heat amount is maximized at maximally-ignition-advanced timing in each overlap angle. The inventors have also found that, when the engine waste heat amount at maximally-ignition-advanced timing is compared between different overlap angles, the smaller an overlap angle is, the larger becomes an engine waste heat amount at maximally-ignition-advanced timing corresponding to the overlap angle (i.e. heat efficiency is lowered).

In light of this, according to another preferred embodiment, there are provided: first control means that controls the overlap angle to a maximally-efficient overlap angle that minimizes fuel consumption of the engine in the case where the ignition timing is permitted to fall on maximum ignition advance timing that is an ignition advance limit, and controls, as the ignition advance control, the ignition timing so as to fall on an ignition advance side with reference to maximum-efficient timing that corresponds to the maximally-efficient overlap angle, according to a requested heat amount of the heat utilization request; and second control means that controls the overlap angle to an overlap angle smaller than the maximally-efficient overlap angle, and controls the ignition timing so as to fall on maximally-ignition-advanced timing that corresponds to an overlap angle after being changed. The first control means and the second control means are configured to be switched according to the requested heat amount in one control mode which is at least any one of the multiple control modes.

With this configuration, waste heat can be increased with optimum fuel consumption by performing the waste heat control using the first control means. Also, when the waste heat control of the second control means cannot satisfy a heat utilization request using the waste heat that has been increased by the first control means, an engine waste heat amount suitable for the requested heat amount can be generated, while fuel-consumption performance is suppressed from lowering (heat efficiency is suppressed from lowering) as much as possible. Thus, according to the present invention, waste heat can be increased by switching control between the first control and the second control in a single control mode. In this way, suppression of the deterioration in the fuel consumption and a heat utilization request can both be satisfied with a good balance therebetween.

According to another preferred embodiment, switching of the control modes is performed in the case where fuel combustion of an engine is temporarily stopped. Specifically, when fuel combustion of an engine is stopped, torque generation of the engine is interrupted. Accordingly, no problem is caused if there is a torque difference before and after the interruption. Therefore, it is desirable that control mode switching is performed when fuel combustion of the engine is stopped.

The cases where fuel combustion of an engine is temporarily stopped include the case where fuel cut is performed during deceleration of the vehicle and the case where an engine is being automatically stopped (idle stop is being performed) in an engine control system that performs automatic stop/restart control (so-called idle stop control).

According to another preferred embodiment, in a vehicle having an engine and an electric motor as drive sources, switching between the control modes is performed in the case where an output ratio of the engine to the electric motor is equal to or less than a predetermined value. Specifically, in a hybrid vehicle having an engine and an electric motor as drive sources, torque variation of the engine, if it is caused, has little influences if the output ratio of the engine to the electric motor is low. Therefore, it is desirable that control mode is switched when the output ratio of an engine to an electric motor is equal to or less than a predetermined value.

According to another preferred embodiment, switching between the control modes is performed in any one of the case where a vehicle installed with the engine is either in an accelerated or decelerated state, the case where an automatic transmission linked to an output shaft of the engine is in a transmission operation, and the case where a lockup mechanism provided between the engine and the automatic transmission is in a lockup-off state.

Torque variation is liable to be caused in a vehicle in the cases where the vehicle is in an accelerated/decelerated state, the automatic transmission is in a transmission operation state, and the lockup mechanism is in a lockup-off state. Thus, torque variation, if it is caused under these states, will be drowned out. Therefore, it is desirable that control mode is switched in any one of the above cases where the vehicle is in an accelerated/decelerated state, the automatic transmission is in a transmission operation state, and the lockup mechanism is in a lockup-off state.

DETAILED DESCRIPTION OF THE PREFERRED EMBODIMENTS

First Embodiment

With reference to the drawings, hereinafter will be described some embodiments in each of which the present invention is applied to a vehicle installed with a spark-ignition multi-cylinder gasoline engine.

Figure 1:
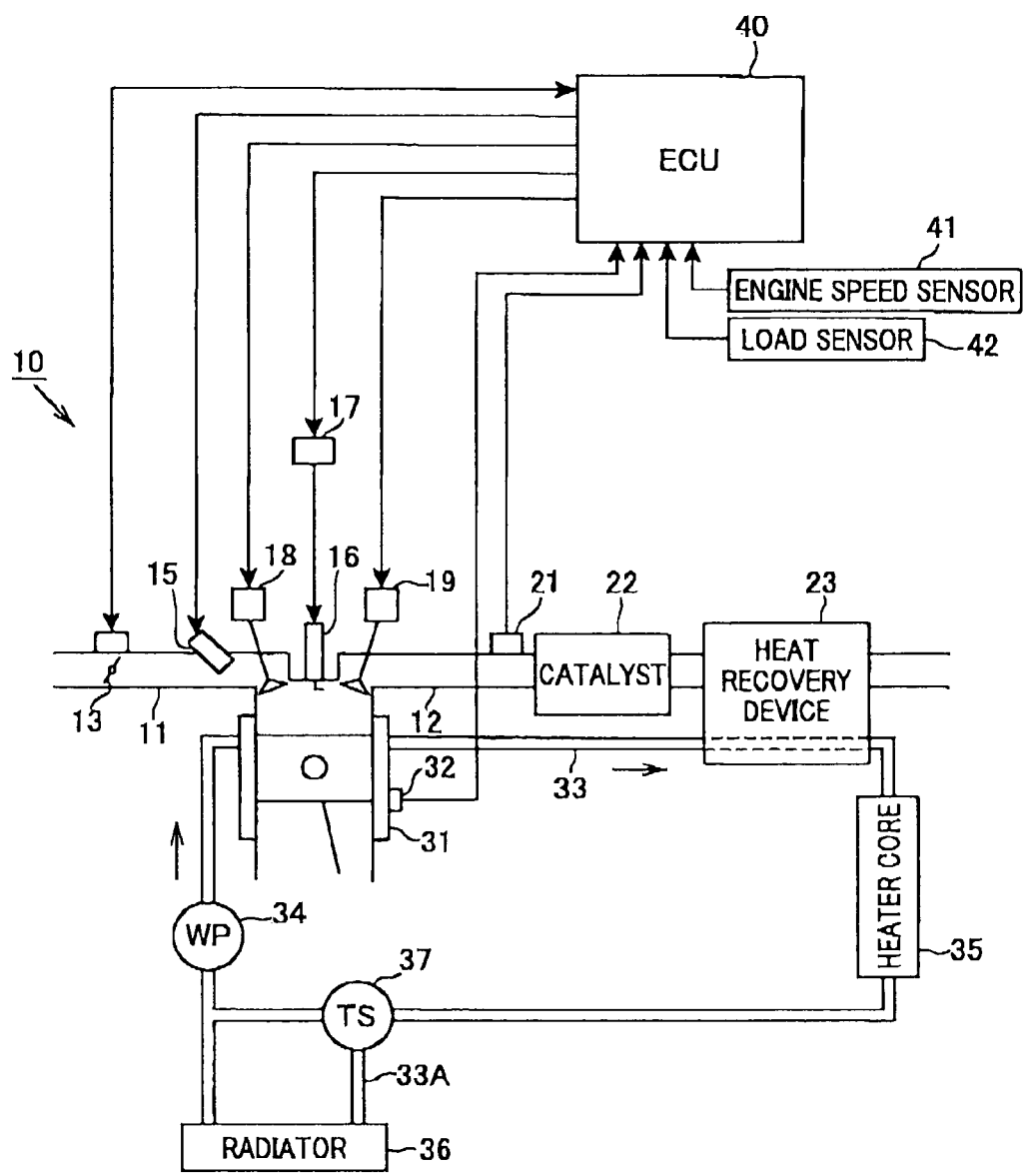
FIG. 1 is a schematic diagram illustrating a waste heat control system to which is applied an apparatus for controlling the amount of waste heat of an engine, according to a first embodiment of the present invention.

FIG. 1 is a schematic diagram illustrating a waste heat control system (waste heat reuse system) of the present embodiment.

In FIG. 1, an engine 10 is connected with an intake pipe 11 and an exhaust pipe 12. The intake pipe 11 is provided with a throttle valve 13 for regulating the amount of intake air to be supplied to cylinders. The throttle valve 13 is an air control device which is electrically on-off actuated by a throttle actuator 14 constituted such as of a motor. The throttle actuator 14 is incorporated with a throttle sensor for detecting opening (throttle opening) of the throttle valve 13.

The engine 10 includes injectors 15 as fuel injecting means that inject fuel for supply to respective cylinders of the engine 10, igniters (ignition devices) 17 as igniting means that cause ignition sparks at ignition plugs 16 provided at the respective cylinders, as well as intake-side valve actuation mechanism 18 and exhaust-side valve actuation mechanism 19 as valve timing adjusting means that adjust on-off timing of the respective intake/exhaust valves. In the configuration of the present embodiment, an intake-port-injection type engine is used, with the injectors 15 being provided in the vicinities of the respective intake ports. Alternatively, a direct-injection type engine may be used, with the injectors 15 being provided at the cylinder head or the like for the cylinders.

The intake- and exhaust-side valve actuation mechanisms 18 and each adjust the amount of ignition advance of intake- and exhaust-side cam shafts for the crank shaft of the engine 10. The intake-side valve actuation mechanism 18 changes the on-off timing of the intake valve to an ignition advance side or an ignition retard side. The exhaust-side valve actuation mechanism 19 changes the on-off timing of the exhaust valve to an ignition advance side or an ignition retard side. Specifically, the valve actuation mechanisms 18 and 19 change an overlap angle of valves when the valve-opening period of the intake valve overlaps with the valve-opening period of the exhaust valve (hereinafter also just referred to as "overlap angle"). The present embodiment is configured to include both the intake-side valve actuation mechanism 18 and the exhaust-side valve actuation mechanism 19. Alternatively, however, either one of the mechanisms 18 and 19 may be provided if only the valve mechanism is on the side of changing valve-opening period in changing the overlap angle.

The exhaust pipe 12 is provided with an oxygen concentration sensor 21 that senses oxygen concentration in the exhaust gas. Also, a catalyst 22 as an exhaust gas purifier is provided downstream of the oxygen concentration sensor 21. For example, the catalyst 22 is a three-way catalyst, which purges harmful components or the like from the exhaust gas when the exhaust gas passes therethrough. In the exhaust pipe 12, a heat recovery device 23 is provided downstream of the catalyst 22 to recover heat energy (exhaust heat) contained in the exhaust gas. The heat recovery device 23 recovers heat in the exhaust gas by permitting the heat to be transferred to engine cooling water. For example, the heat recovery device 23 is used as a heat source in performing heating of the vehicle cabin.

An explanation is given hereinafter regarding the configuration of a cooling system of the engine 10.

The engine 10 has a cylinder block or a cylinder head in which water jackets 31 are formed. The engine 10 is adapted to be cooled by circulating and supplying cooling water to the water jackets 31. The temperature of the cooling water (cooling water temperature) in each water jacket 31 is sensed by a water temperature sensor 32. A circulation path 33 consisting such as of cooling water piping is connected to each water jacket 31. Further, a water pump 34 is connected to the circulation path 33 to circulate the cooling water. For example, the water pump 34 is a mechanical pump driven with the rotation of the engine 10, but may alternatively be an electrically operated pump. Also, it may be so configured that the amount of the cooling water is regulated by the water pump 34.

The circulation path 33 is provided such that it extends, on the exit side of the engine 10 (water jacket 31), toward the heat recovery device 23 and that it returns to the engine 10 via the heat recovery device 23. In the circulation path 33, a heater core 35 is provided downstream of the heat recovery device 23. Air-conditioning wind is ensured to be supplied from a blower fan, not shown, to the heater core 35. The air-conditioning wind, when passing through or near the heater core 35, is heated by the heat received from the heater core 35 to supply the resultant warm air to the vehicle cabin.

The circulation path 33 is branched into two directions on the downstream side of the heater core 35. A radiator 36 is provided at a circulation path 33A, one of the two branched portions, to serve as an externally radiating unit. At the portion from where the circulation path 33 branches, a thermostat 37 is provided, which operates in response to the temperature of the cooling water to change the channel of the cooling water. Thus, when the temperature of the cooling water is low (the operating temperature of the thermostat is low), the cooling water is prevented from being flowed to the side of the radiator 36 by the thermostat 37. Resultantly, the cooling water circulates through the circulation path 33 with its heat not being radiated from the radiator 36. For example, cooling of (heat radiation for) the cooling water in the radiator 36 is suppressed before completion of warming-up (during warm-up) of the engine 10. When the temperature of the cooling water becomes high (higher than the operating temperature of the thermostat), the cooling water is allowed to flow into the side of the radiator 36 by the thermostat 37. Resultantly, the cooling water circulates through the circulation path 33 while its heat is radiated by the radiator 36. Thus, the temperature of the cooling water is optimally maintained (e.g., at about 80° C.) under the conditions where the engine is in operation.

The present control system is provided with an ECU (electronic control unit) 40 which centrally performs engine controls. The ECU 40 carries out various controls associated with the operation of the engine 10. Specifically, as is well known, the ECU 40 is mainly configured by a microcomputer consisting such as of a CPU, ROM and RAM. The ECU 40 executes various control programs stored in the ROM to carry out the various controls of the engine 10 according to the engine driving condition. The present system is provided with operating state sensing means for sensing the engine driving conditions, including an engine speed sensor 41 that senses the engine speed and a load sensor 42 that senses engine loads, such as the amount of intake air and the negative pressure in the intake pipe. Detection signals are appropriately inputted to the EPU 40, being derived from these sensors 41 and 42, as well as from the oxygen concentration sensor 21, the water temperature sensor 32, and the like mentioned above.

The ECU 40 inputs the detection signals from the various sensors mentioned above and performs fuel injection control with the injectors 15, ignition timing control with the igniters 17, valve timing control with the valve actuation mechanisms 18 and 19, and air amount control with the throttle valve 13 (throttle actuator 14), based on the various detection signals. Basically, these controls are performed based on matching data, for example, so that maximum efficiency (minimum fuel consumption) can be achieved in the engine 10 in each engine driving condition.

For example, regarding the ignition timing control, such parameters as engine speed and engine load associated with each engine driving condition are used. Based on these parameters, an ignition timing closest to the ignition timing that maximizes torque (MBT: Minimum Advance for Best Torque) is set for each engine driving condition, within a range not exceeding a knock limit. In other words, the ignition timing is controlled to be a maximum-efficient timing (optimum ignition timing MBT or close to the optimum ignition timing MBT) at which the fuel consumption is maximized in each engine driving condition.

Figure 2:
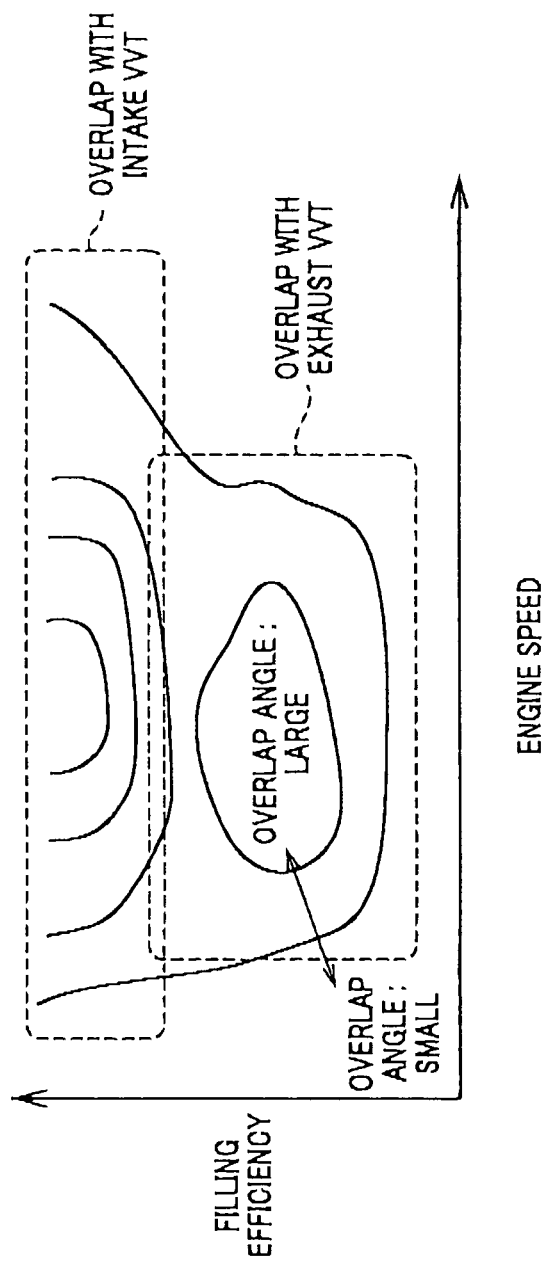
FIG. 2 is a diagram illustrating the relationship between engine speed, filling efficiency and overlap angle.

Regarding the valve timing control, a valve overlap angle is set using the engine speed and engine load, for example, as parameters. For example, during a middle-load operation, a valve overlap angle is ensured to be increased to increase the amount of burned gas spitted to the intake path (internal EGR amount) to thereby lower the combustion temperature for the reduction of NOx emission. Alternatively, during a low-load operation, the overlap angle is ensured to be decreased to decrease the internal EGR amount to thereby enhance the fuel consumption. FIG. 2 shows a relationship between engine driving condition and overlap angle. FIG. 2 shows charging efficiency which changes depending on the engine speed and engine load in an engine driving condition.

Further, in the present control system, heat energy that is a heat loss (energy other than kinetic energy) is recovered for reuse from the fuel combustion energy generated by combusting fuel in the engine 10, whereby the fuel consumption of the system as a whole is ensured to be improved. Specifically, the ECU 40 performs waste heat control of the engine 10 based on each heat utilization request and engine driving condition.

To specifically explain waste heat control, the ECU 40 is provided with a waste heat control device that increases or decreases the amount of waste heat (generated heat) that is the heat energy (heat loss) of the engine 10. The EPC 40 regulates the amount of waste heat of the engine 10 using the waste heat control device in response to a heat utilization request, such as a warm-up request. The present embodiment is configured to control the engine waste heat by changing at least either of ignition timing or valve timing according to a heat utilization request.

The engine operating efficiency and the engine waste heat are in a contradictory relationship. When the engine operating efficiency is high, the engine waste heat is decreased. Therefore, it is considered that recent engines having good engine operating efficiency may generate less engine waste heat and are not able to perform waste heat control in conformity with a heat utilization request. For example, when there is a request associated with heating, such as a request for starting heating with the vehicle cabin air conditioner or a request for raising the vehicle cabin temperature, heat which is sufficient for satisfying the heating request may not be transferred to the engine cooling water. As a result, air conditioning control satisfying the driver's request may not be performed. In such a case, the engine waste heat may be increased by changing the ignition timing or the valve timing. In this case, however, deterioration in the fuel consumption accompanying the deterioration in the engine operating efficiency is required to be suppressed as much as possible.

The inventors of the present invention earnestly discussed a method for generating sufficient amount of engine waste heat (cooling water heat amount) for satisfying a heat utilization request, which method at the same time can suppress the deterioration in the fuel consumption as much as possible. As a result, the inventors have found that a suitable combination of ignition timing and overlap angle can take out the engine waste heat with the use of the engine cooling water, which waste heat can satisfy a heat utilization request, while fuel consumption is suppressed from being deteriorated as much as possible.

Figure 3:
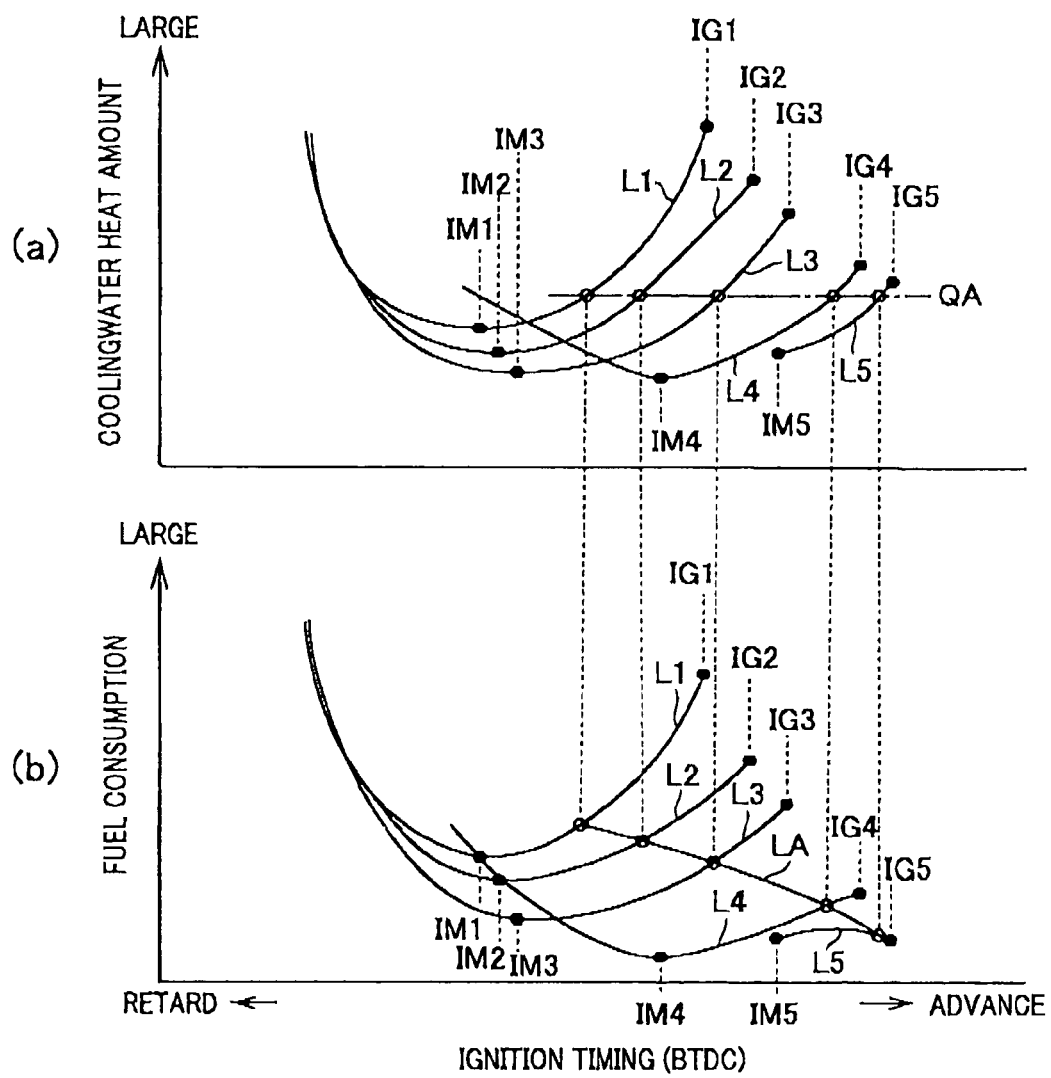
FIG. 3 is an explanatory diagram illustrating waste heat control performed on an ignition advance side with reference to maximum-efficient timing.

The waste heat control according to the present embodiment is specifically described with reference to the map shown in FIG. 3. In FIG. 3, the horizontal axis indicates ignition timing. The vertical axis in (a) indicates cooling water heat amount and the vertical axis in (b) indicates fuel consumption. In the figure, L1 to L5 indicate different overlap angles which, as can be seen, increase in this order. In the figure, with L2 being a reference overlap angle, the respective overlap angles increase or decrease on a 10° CA basis. In FIG. 3, an engine driving condition is assumed, regarding the ignition timing, to be in a status where the MBT is on the ignition advance side with reference to the knock limit. Also, in FIG. 3, the overlap angle is made variable by permitting the exhaust-side valve actuation mechanism 19 to change the valve-opening period of the exhaust valve to the ignition advance side or to the ignition retard side.

Regarding (a), lines L1 to L5 indicate a relationship between ignition timing and cooling water heat amount for each of the overlap angles. As indicated by lines L1 to L5, the ignition timing characteristics are different between the overlap angles. In the overlap angles, respective control ranges of ignition timing correspond to the respective regions sandwiched between maximally-ignition-advanced timings IG1 to IG5 and maximally-ignition-retarded timings. The maximally-ignition-advanced timings IG1 to IG5 correspond to ignition advance limits which are determined by the knock limit or the peak position restriction of cylinder pressure. The maximally-ignition-retarded timings correspond to ignition retard limits which are determined in order to limit torque variation. Comparing the maximally-ignition-advanced timings IG1 to IG5 with each other in the respective overlap angles, the maximally-ignition-advanced timings are permitted to fall more on the ignition advance side as the overlap angles become larger.

Lines L1 to L4 are indicated by downward convex curves in the control ranges of ignition timing. Specifically, cooling water heat amount is minimized at each of the inflection points. Whichever the ignition timing is shifted, to the ignition advance side or to the ignition retard side, from the inflection point, the recovered heat amount is increased. Further, when the ignition timing is on the ignition retard side with reference to the inflection point, the cooling water heat amount is maximized at the maximally-ignition-retarded timing. When the ignition timing is on the ignition advance side with reference to the inflection point, the cooling water heat amount is maximized at each of the maximally-ignition-advanced timings IG1 to IG4. Regarding line L5, there is no inflection point at an intermediate position between the maximally-ignition-advanced timing IG5 and the maximally-ignition-retarded timing. Instead, the cooling water heat amount is minimized at the maximally-ignition-retarded timing and maximized at the maximally-ignition-advanced timing IG5. Comparing the cooling water heat amounts with each other at the maximally-ignition-advanced timings IG1 to IG5, the cooling water heat amount is increased as the overlap angle is decreased.

Regarding (b), lines L1 to L5 indicate the relationship between ignition timing and fuel consumption for the respective overlap angles. Lines L1 to L5 of (b) correspond to lines L1 to L5 of (a), respectively. According to lines L1 to L4 of (a) and (b), the fuel consumption is minimized, or the minimum fuel consumption is obtained, at the inflection points of (a). Also, when the ignition timing is shifted from the inflection point to the ignition advance side or to the ignition retard side, the fuel consumption is increased. Specifically, the inflection points of (a) correspond to the optimum ignition timings MBT which correspond to maximum-efficient timings IM1 to IM4. Accordingly, the cooling water heat amount is minimized at the MBT. At the same time, the cooling water heat amount is increased by advancing or retarding ignition with reference to the MBT. On the other hand, however, the fuel consumption is deteriorated, and hence if, for example, the ignition timing is on the ignition advance side with reference to the inflection point, the cooling water heat amount is maximized at the maximally-ignition-advanced timings IG1 to IG4, accompanying which fuel consumption is increased as well.

Regarding L5, the MBT resides on the ignition retard side with reference to the maximally-ignition-advanced timing IG5, and the maximally-ignition-retarded timing falls on the maximum-efficient timing IM5. Further, the cooling water heat amount is minimized at the maximally-ignition-retarded timing which is the maximum-efficient timing IM5, and maximized at the maximally-ignition-advanced timing IG5.

To explain more about fuel consumption, when the fuel consumptions at the maximally-ignition-advanced timings IG1 to IG5 are compared with each other between the overlap angles, the larger the overlap angle becomes, the smaller the fuel consumption becomes. Further, when the fuel consumptions are compared with each other in the case where the ignition timing is changed from the maximum-efficient timings IM1 to IM5 to the maximally-ignition-advanced timings IG1 to IG5, the larger the overlap angle becomes, the smaller the fuel consumption becomes.

Let us discuss now the relationship of overlap angle and ignition timing for recovering a desired cooling water heat amount, with fuel consumption. As can be seen from FIG. 3, when ignition timing is on the ignition retard side with reference to the MBT, fuel consumption does not significantly differ between the overlap angles. On the other hand, when ignition timing is on the ignition advance side with reference to the MBT, fuel consumption significantly differs between the overlap angles.

Specifically, let us discuss the case where a cooling water heat amount is permitted to be a predetermined amount QA by advancing ignition. Let us correlate, here, the overlap angle and ignition timing for realizing the predetermined amount QA, with fuel consumption. In this case, as shown by (b) of FIG. 3, the larger the overlap angle becomes, the smaller the fuel consumption becomes. In other words, when the ignition timing is shifted to the ignition advance side or to the ignition retard side without changing the overlap angle, the fuel consumption unavoidably increases in large scale with the increase of the cooling water heat amount. On the other hand, when the overlap angle is changed in an increasing manner and the ignition timing is shifted to the ignition advance side in conformity with the increase of the overlap angle, deterioration in the fuel consumption can be suppressed as much as possible in generating a desired amount of cooling water heat.

In the waste heat control of the present embodiment, upon increment of a requested value (requested heat amount) of the cooling water heat amount, which value corresponds to a heat utilization request, the overlap angle is changed in an increasing manner and the ignition timing is controlled to fall on the ignition advance side with reference to the maximum-efficient timing (optimum ignition timing MBT or close to the optimum ignition timing MBT) corresponding to an overlap angle after being increased. More specifically, the relationship of overlap angle with ignition timing at the maximum-efficient timings IM1 to IM5 and at the maximally-ignition-advanced timings IG1 to IG5 is stored in advance in an ROM, for example. Thus, the overlap angle is controlled to be a maximally-efficient overlap angle, i.e. a maximally-overlapped angle, which can minimize the fuel consumption of the engine 10 when the ignition timing is permitted to fall on the maximally-ignition-advanced timings IG1 to IG5. At the same time, according to the requested heat amount, the ignition timing is controlled to fall on the ignition advance side with reference to the maximum-efficient timing IM5 that corresponds to the maximally-overlapped angle.

Figure 4:
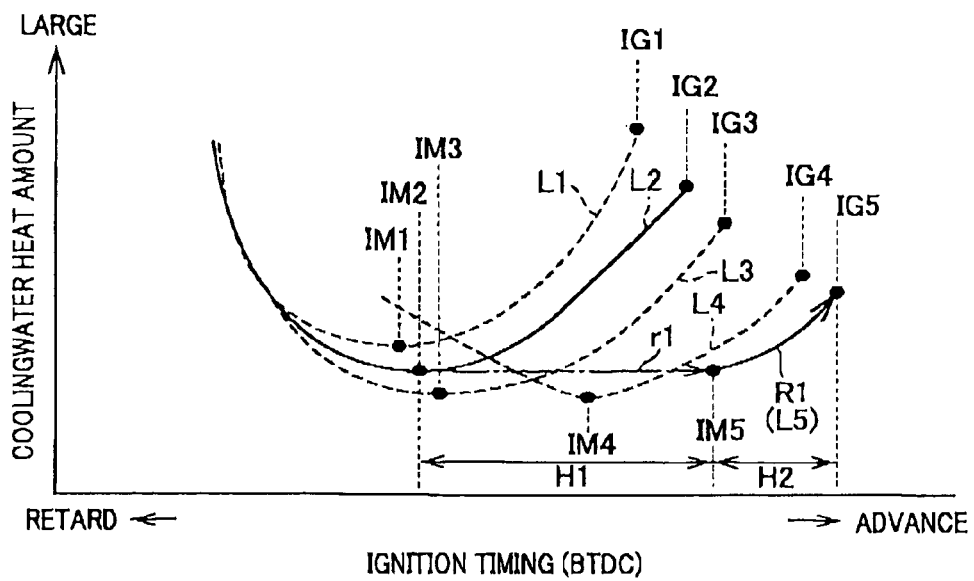
FIG. 4 is an explanatory diagram illustrating first control.

Referring now to FIG. 4, the present waste heat control is more specifically described. For example, in FIG. 4, let us discuss the case where the overlap angle is controlled to be a reference overlap angle (L2 in the figure) and the engine control is performed with the optimum ignition timing (IM2) corresponding to the reference overlap angle, and where the engine driving condition then cannot satisfy a requested heat amount. In this case, as indicated by an arrow r1 of FIG. 4, the overlap angle is changed to the maximally-overlapped angle (L5 in the figure) that is the maximum value in a control available range. Then, as shown in FIG. 4, using a relationship R1 between the ignition timing and the cooling water heat amount in the maximally-overlapped angle, the ignition timing is shifted to the ignition advance side with reference to the maximum-efficient timing IM5 in the maximally-overlapped angle, according to the requested heat amount. To explain more about the ignition timing, the ignition timing is corrected to fall on the ignition advance side by an amount corresponding to the sum of a first ignition advance correction amount H1, which is based on the assumption that the ignition timing control is performed at the maximum-efficient timing, and a second ignition advance correction amount H2 for changing the ignition timing in an ignition-advancing manner from the maximum-efficient timing according to the requested heat amount.

However, when the cooling water heat amount is increased by way of r1 and R1 mentioned above, the ignition timing may be restricted by the maximally-ignition-advanced timing IG5 and, as a result, the maximum value of a recoverable cooling water heat amount may become comparatively small. Specifically, as shown in FIG. 4, comparing the cooling water heat amounts with each other at the maximally-ignition-advanced timings IG1 to IG5 of the respective overlap angles, a larger overlap angle makes smaller the recoverable cooling water heat amount at the maximally-ignition-advanced timings IG1 to IG5. Thus, the cooling water heat amount may not become significantly large at the maximally-ignition-advanced timing IG5 that corresponds to the maximally-overlapped angle. Accordingly, it is considered that, under the above waste heat control using the ignition timing characteristics of the maximally-overlapped angle, the waste heat that can be generated may be restricted to a comparatively small value.

On the other hand, when the cooling water heat amount is to be increased more than a heat amount that can be generated with the maximally-overlapped angle, it is desirable that the overlap angle is made as large as possible, from the viewpoint of suppressing the deterioration in the fuel consumption. In other words, it is required to make the decrease in the overlap angle as small as possible for the maximally-overlapped angle and, at the same time, to increase the cooling water heat amount. In this regard, the inventors of the present invention have paid attention to the fact that, when the ignition timing is shifted to the ignition advance side with reference to the MBT and when the cooling water heat amount at different ignition timings in this case is compared between the respective overlap angles, the cooling water heat amount is maximized at the maximally-ignition-advanced timings IG1 to IG5. The inventors have also paid attention to the fact that, when the cooling water heat amounts at the maximally-ignition-advanced timings IG1 to IG5 are compared with each other, the smaller the overlap angle is, the larger the cooling water heat amount becomes at the maximally-ignition-advanced timings IG1 to IG5.

Specifically, in the present embodiment, under the above control (first control), the overlap is controlled to be the maximally-overlapped angle and the ignition timing is shifted to the ignition advance side with reference to the maximum-efficient timing according to a requested heat amount. In addition to the first control, second control is performed, under which the overlap is controlled to be smaller than the maximally-overlapped angle and the ignition timing is controlled to fall on the maximally-ignition-advanced timing corresponding to the overlap angle of the moment. If a heat utilization request cannot be satisfied by the first control (if generated heat is insufficient), the second control is performed to control the waste heat of the engine 10.

Figure 5:
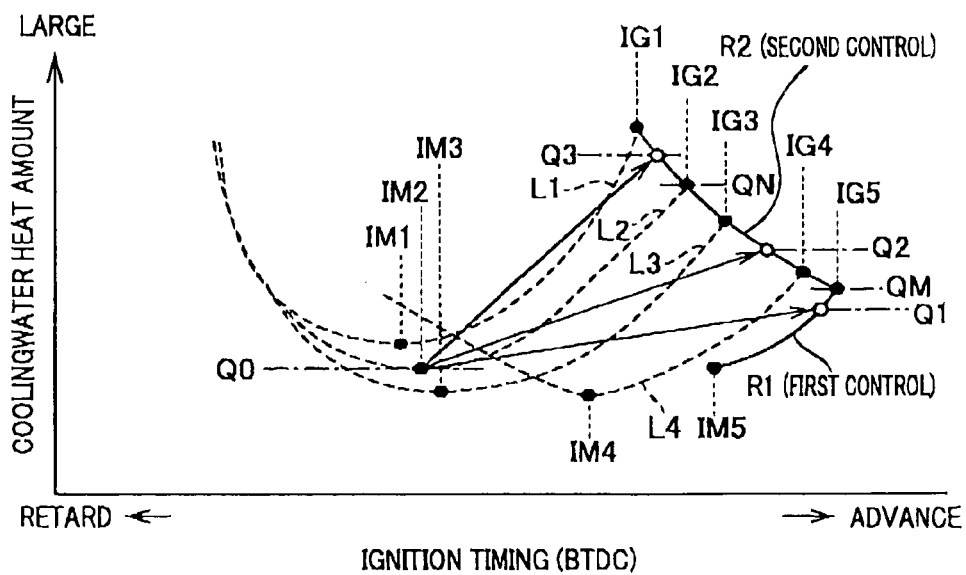
FIG. 5 is an explanatory diagram illustrating first and second controls.

More specifically, as shown in FIG. 5, the present waste heat control consists of the first control under which waste heat control is performed based on the relationship R1 between ignition timing and cooling water heat amount in the maximally-overlapped angle, and the second control under which waste heat control is performed based on a relationship R2 between maximally-ignition-advanced timing and cooling water heat amount which are determined for each overlap angle. Under the waste heat control, the maximum value of a cooling water heat amount recoverable under the first control is compared with a requested heat amount. As a result, if the requested heat amount is smaller than or equal to the maximum value, the first control is performed. If the requested heat amount is larger than the maximum value, the second control is performed. As indicated by R2 of FIG. 5, in the case where the cooling water heat amount is to be increased under the second control, the overlap angle is decreased and the ignition timing is retarded as the requested heat amount becomes larger.

Figure 6:
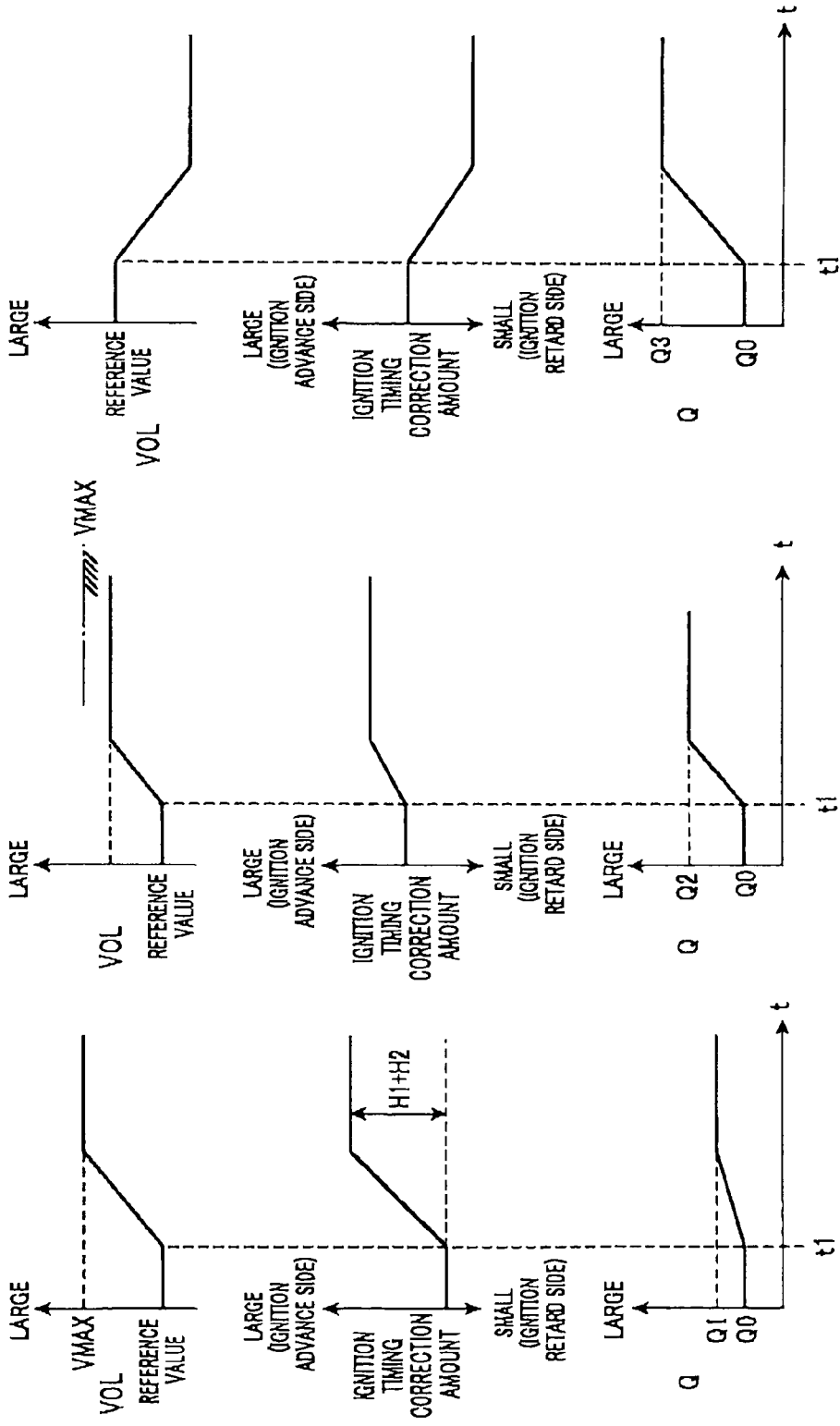
FIGS. 6A to 6C are time diagrams each illustrating a specific mode of the present waste heat control.

Referring now to the time diagrams of FIG. 5 and FIGS. 6A to 6C, hereinafter is described a specific mode of the present waste heat control. Of FIGS. 6A to 6C, FIG. 6A shows the case where the cooling water heat amount is increased under the first control. FIGS. 6B and 6C show the case where the cooling water heat amount is increased under the second control. FIGS. 6A to 6C illustrate the case where the cooling water heat amount is increased from Q0 to each value of Q1–Q3 when the engine driving condition before the increase of the generated heat amount is being controlled with the maximum-efficient timing IM2 on L2. In the time diagrams of FIGS. 6A to 6C showing ignition timing correction amount, it is indicated that the ignition timing is shifted more to the ignition advance side as the correction amount becomes larger.

In the present waste heat control, regarding which of the first and second controls is to be used to increase the amount of engine waste heat (cooling water heat amount) depends on whether or not the heat utilization request can be satisfied by the maximally-ignition-advanced timing IG5 in the maximally-overlapped angle.

Specifically, in FIGS. 6A to 6C, when a heating request as a heat utilization request is issued at timing t1, heat is utilized (warm air is produced) in the heater core 35 with the request, thereby lowering the cooling water temperature. Then, when the cooling water temperature becomes lower than a lower limit value in an appropriate temperature range, the waste heat control of the engine 10 is performed.

In this case, the waste heat control based on the first control is performed if the requested heat amount of the heating request is at a level Q1 of FIG. 5, i.e. if the requested heat amount is smaller than a generated heat amount (overlap maximum heat amount) QM at the maximally-ignition-advanced timing IG5 in the maximally-overlapped angle. Specifically, as shown in FIG. 6A, when a requested heat amount is increased with the issuance of the heating request at the timing t1, an overlap angle VOL is increased up to a maximum value VMAX and, at the same time, the ignition timing is shifted to the ignition advance side. In this case, the ignition timing is shifted to the ignition advance side from the maximum-efficient timing IM2 by an amount corresponding to the sum of the ignition advance correction amount H1 based on the increase of the overlap angle VOL and the ignition advance correction amount H2 based on the requested heat amount (H1+H2). Thus, a cooling water heat amount Q is increased from Q0 to Q1.

Subsequently, let us discuss the case where a requested heat amount is at a level Q2 of FIG. 5, i.e. the case where a requested heat amount is larger than the overlap maximum heat amount QM. The requested heat amount Q2 here has a value smaller than a generated heat amount (maximally-ignition-advanced heat amount) QN at the maximally-ignition-advanced timing IG2 in the overlap angle VOL (the overlap angle corresponding to L2 here) before the increase of the generated heat amount.

In this case, since the requested heat amount is larger than the overlap maximum heat amount QM, the waste heat control is performed based on the second control. Specifically, as shown in FIG. 6B, the overlap angle VOL is increased with the maximum value VMAX as an upper limit and, at the same time, the ignition timing is shifted to the ignition advance side. In other words, the overlap angle VOL is increased if the requested heat amount is larger than the heat amount (overlap maximum heat amount) QM that can be generated at the maximally-ignition-advanced timing IG5 in the maximally-overlapped angle, and smaller than the heat amount (maximally-ignition-advanced heat amount) QN that can be generated at the maximally-ignition-retarded timing in the overlap angle VOL before the increase of the heat amount. Then, the ignition timing is controlled to be the maximally-ignition-advanced timing corresponding to the overlap angle VOL after the increase.

Further, as shown in FIG. 6C, the overlap angle VOL is made small if the requested heat amount is at a level Q3 of FIG. 5, i.e. if the requested heat amount is larger than the maximally-ignition-advanced heat amount QN and, at the same time, the ignition timing is shifted to the ignition retard side. In other words, the overlap angle VOL is decreased if the requested heat amount is larger than the heat amount (maximally-ignition-advanced heat amount) QN that can be generated at the maximally-ignition-advanced timing in the overlap angle VOL before the increase of the generated heat amount. Then, the ignition timing is controlled to be the maximally-ignition-advanced timing corresponding to the overlap angle VOL after the decrease.

Figure 7:
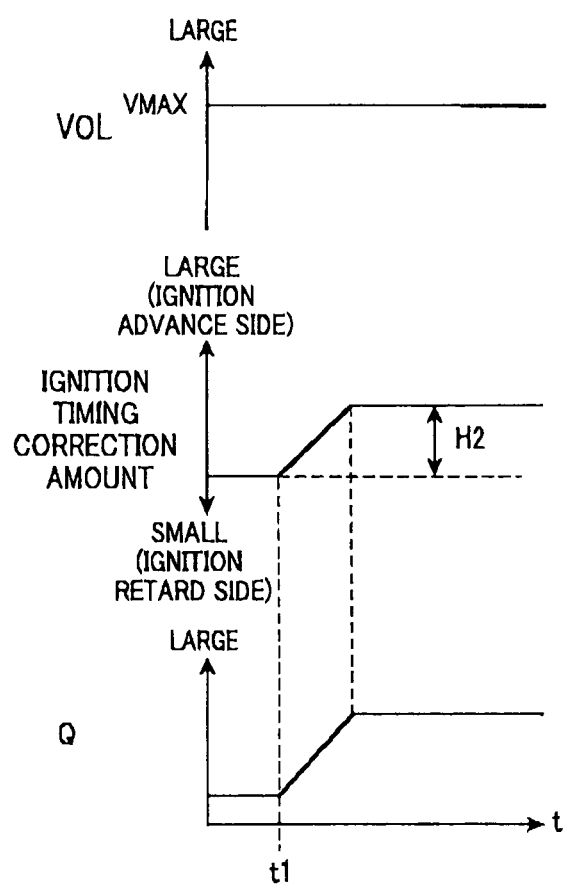
FIG. 7 is a time diagram illustrating a specific mode of the present waste heat control.

The overlap angle VOL may have been controlled to be the maximum value when a heating request is made. In this case, as shown in a time diagram of FIG. 7, the overlap angle VOL is kept at the maximum value VMAX while the ignition timing is shifted to the ignition advance side by an amount corresponding to the ignition advance correction amount H2, which is based on the requested heat amount, to thereby increase a cooling water heat amount Q.

Figure 8:
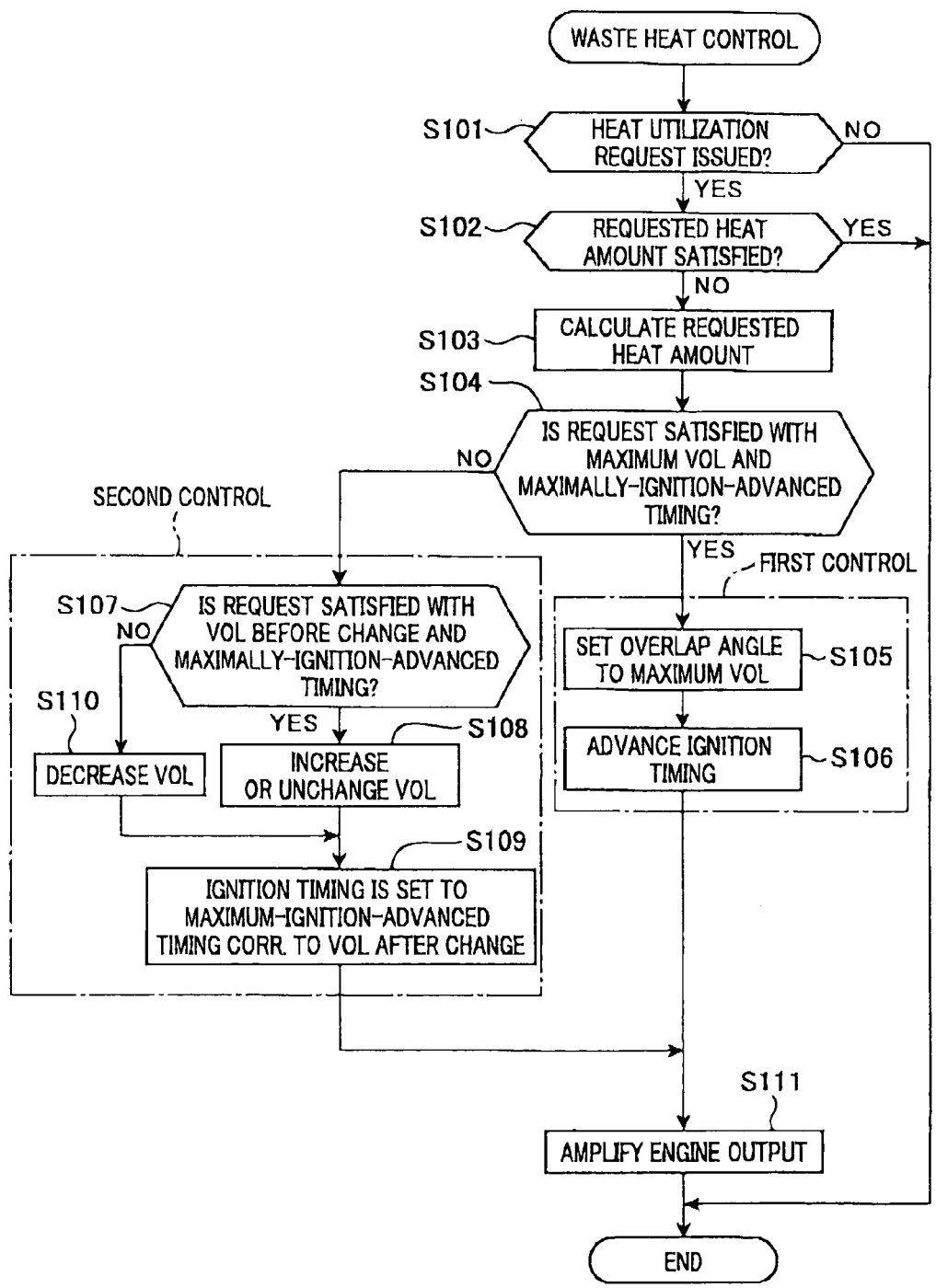
FIG. 8 is a flow diagram illustrating a procedure of the present waste heat control.

FIG. 8 is a flow diagram illustrating processes performed in a procedure of the present waste heat control. These processes are performed by the ECU 40 at a predetermined cycle.

In FIG. 8, it is determined, at step S101, first, whether or not a heating request as a heat utilization request has been issued.

The heating request is issued, for example, when heating of the vehicle cabin is to be started or when the temperature of the vehicle cabin is to be raised. Thus, a heating request is issued based on an operation of a vehicle occupant or a control command under the automatic air conditioning control. Then, on condition that a heating request has been issued, control proceeds to step S102.

At step S102, it is determined whether or not the requested heat amount of the moment can be satisfied under the currently performed engine control (e.g., normal engine control performed at a minimum point of fuel consumption), i.e. whether or not the engine waste heat amount is required to be increased using the first and second controls described above. For example, when a heating request has been received, it is determined whether or not a cooling water temperature Tw sensed by the water temperature sensor 32 is lower than the appropriate temperature range.

If the requested heat amount can be satisfied under the current engine control, increase of the waste heat amount is regarded as not being required and thus the present procedure is instantly ended. On the other hand, if the requested heat amount cannot be satisfied, the processes at the subsequent step 103 and the following steps are performed.

At step S103, the requested heat amount is calculated as a requested value of a cooling water heat amount to be generated in response to the heating request. The requested heat amount is calculated based on one or more parameters from among the cooling water temperature Tw or the cooling water flow rate, the rotational speed of the blower fan, the outside air mix rate, the outside air temperature, the set temperature of the air conditioner, the blowing temperature of the air conditioner, and the like. At step S104, the calculated requested heat amount is compared with the waste heat amount (overlap maximum heat amount, i.e. QM in FIG. 5) that can be generated at the maximally-ignition-advanced timing in the maximally-overlapped angle. Then, when the requested heat amount is equal to or smaller than the overlap maximum heat amount QM, control proceeds to steps S105 and S106 to increase the engine waste heat amount by performing the first control.

Specifically, at step S105, the overlap angle is set to the maximum value VMAX. At step S106, the current ignition timing is set to the ignition advance side by an amount corresponding to the sum of the ignition advance correction amount H1 and the ignition advance correction amount H2 (H1+H2). With the ignition advance correction amount H1, ignition is advanced from the maximum-efficient timing before the increase of the overlap angle to the maximum-efficient timing after the increase of the overlap angle. With the ignition advance correction amount H2, ignition is advanced from the maximum-efficient timing according to the requested heat amount, with the overlap angle after the increase. Thus, the overlap angle is changed to the maximum value VMAX under valve timing control based on a different routine, not shown. Also, the ignition timing is shifted to the ignition advance side by an amount corresponding to the correction amount (H1+H2) under ignition timing control based on a different routine, not shown.

Figure 9:
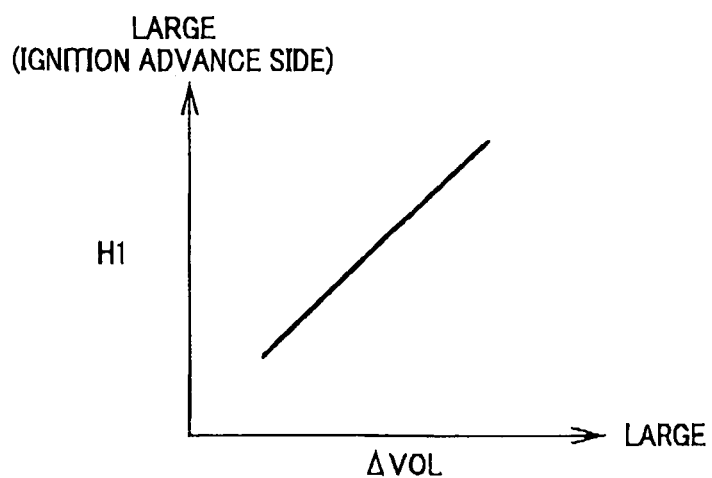
FIG. 9 is an explanatory diagram illustrating a first ignition advance correction amount H1.

Of the ignition timing corrections, the ignition advance correction amount H1 is set to a large value, as exemplified in FIG. 9, so that the amount of ignition advance is increased more as a change amount $\Delta$VOL is increased in a manner of increasing the overlap angle. Also, as exemplified in FIG. 10, the ignition advance correction amount H2 is set to a large value so that the amount of ignition advance is increased more as a difference $\Delta$Q becomes larger between the cooling water heat amount under the current engine control and the requested heat amount, i.e. as the increase of heat amount becomes larger.

At the time of the issuance of a heating request, if the engine control has been performed in the maximally-overlapped angle with the maximally-ignition-advanced timing, the ignition timing is not changed, at step S106, but the maximally-overlapped angle is maintained as it is.

On the other hand, if the requested heat amount is larger than the overlap maximum heat amount QM, processes at steps S107 to S110 are performed as the second control.

Figure 11:
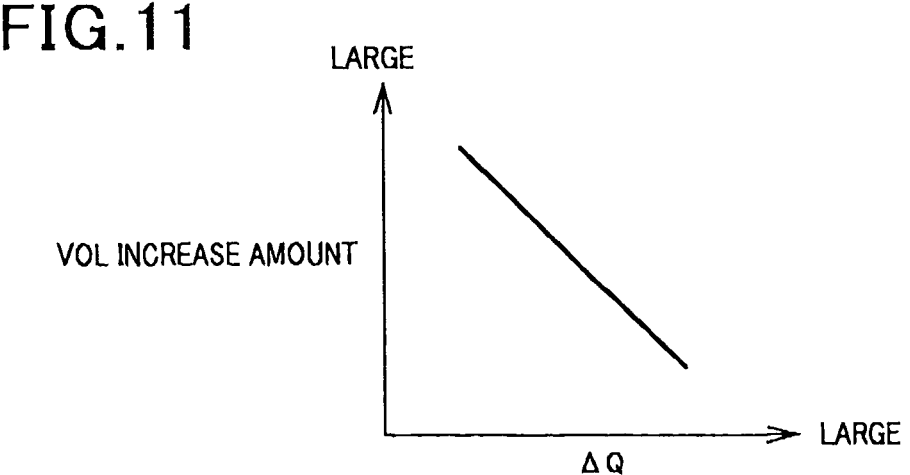
FIG. 11 is a diagram illustrating increase in the overlap angle under the second control.

Specifically, at step S107, the cooling water heat amount at the maximally-ignition-advanced timing, which amount corresponds to the overlap angle before the increase of heat amount (maximally-ignition-advanced heat amount, i.e. QN of FIG. 7), is compared with the requested heat amount. If the requested heat amount is smaller than the maximally-ignition-advanced heat amount QN and thus the requested heat amount can be satisfied with the maximally-ignition-advanced heat amount, the overlap angle is increased, at step S108, to maximize the effect of suppressing the deterioration in the fuel consumption. At the same time, at step S109, the ignition timing is set to the maximally-ignition-advanced timing corresponding to the overlap angle after being increased. In this case, as shown in FIG. 11, for example, change in the overlap angle of the moment is made smaller, as a to-be-increased heat amount (difference between the cooling water heat amount under the currently performed engine control and the requested heat amount) $\Delta$Q becomes larger. It should be appreciated that, when the requested heat amount is equal to the maximally-ignition-advanced heat amount, the overlap angle is maintained as it is.

Figure 12:
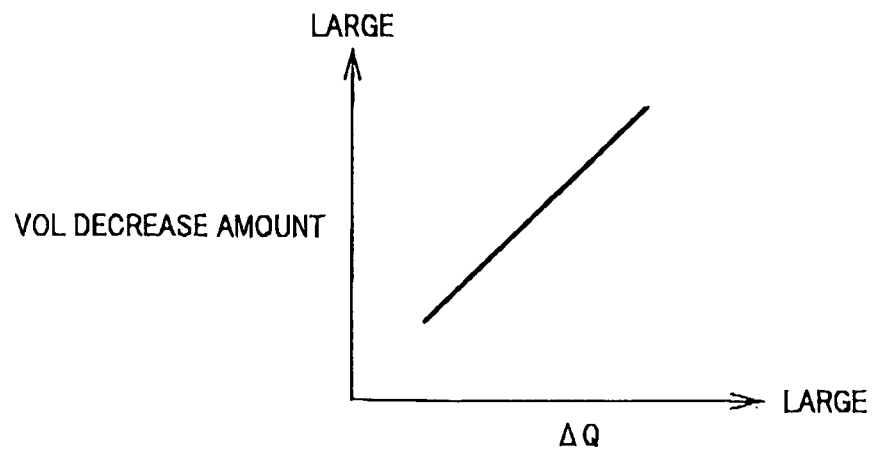
FIG. 12 is a diagram illustrating decrease in the overlap angle under the second control.

On the other hand, when the requested heat amount is larger than the maximally-ignition-advanced heat amount QN, the overlap angle is decreased at step S110. At the same time, at step S109, the ignition timing is set to the maximally-ignition-advanced timing corresponding to the decreased overlap angle. In this case, as shown in FIG. 12, for example, as the to-be-increased heat amount $\Delta$Q becomes larger, the change in the overlap angle of the moment is made larger. Thus, higher priority is given to the realization of the heat utilization request while deterioration in the fuel consumption is suppressed as much as possible.

Finally, at step S111, an engine output augmentation process is performed. The engine output augmentation process is performed for augmenting the engine output deteriorated by the waste heat control in the case where the waste heat control has been performed as described above. With this process, an increasing correction for the fuel injection quantity or an increasing correction for the air quantity (throttle opening) is appropriately conducted. Then, the present procedure is ended.

According to the present embodiment specifically described so far, the following surpassing advantages are obtained.

It has been so configured that, when a requested heat amount cannot be satisfied, the overlap angle is changed in an increasing manner as waste heat control which is based on the first control. In addition, it has been so configured that, in this case, ignition timing is shifted to the ignition advance side with reference to the maximum-efficient timing (MBT or close to MBT) after the change of the overlap angle in an increasing manner. More specifically, it has been so configured that a predetermined relationship is established for the overlap angle with the maximum-efficient timing of the ignition timing and with the maximally-ignition-advanced timing. Based on this relationship, the overlap angle has been controlled to the maximally-efficient overlap angle (maximally-overlapped angle) which can minimize the fuel consumption of the engine 10 under the condition where the ignition timing is permitted to fall on the maximally-ignition-advanced timing. In addition, the control has been effected such that the ignition timing falls on the ignition advance side with reference to the maximum-efficient timing in the maximally-overlapped angle, according to the requested heat amount. In this way, fuel consumption can be suppressed as much as possible, while waste heat control can be performed in response to the heat utilization request.

It has been so configured that, in the waste heat control based on the first control, the ignition timing is controlled based on the first ignition advance correction amount H1 and the second ignition advance correction amount H2. In the first ignition advance correction amount H1, ignition is advanced by changing the ignition timing from the maximum-efficient timing before the increase of the overlap angle to the maximum-efficient timing after the increase of the overlap angle. With the second ignition advance correction amount H2, ignition is advanced by changing the ignition timing from the maximum-efficient timing according to the requested heat amount in the overlap angle after being increased. In this way, deterioration in the fuel-consumption performance can be favorably suppressed.

It has been so configured that the waste heat control is constituted of the first control and the second control. In the first control, the overlap angle has been controlled to the maximally-efficient overlap angle that can minimize the fuel consumption of the engine 10 under the condition where the ignition timing is permitted to fall on the maximally-ignition-advanced timing. Also, in the first control, the ignition timing has been controlled to fall on the ignition advance side with reference to the maximum-efficient timing corresponding to the overlap angle of the moment, according to the requested heat amount. In the second control, the overlap angle has been controlled to be smaller than the maximally-efficient overlap angle, and the ignition timing has been controlled to be the maximally-ignition-advanced timing corresponding to the overlap angle of the moment. With this configuration, if the requested heat amount can be satisfied by the heat generation under the first control, waste heat control has been performed under the first control, and if the requested heat amount cannot be satisfied by the heat generation under the first control, waste heat control has been performed under the second control. In this way, if the requested heat amount cannot be satisfied by the first control while waste heat control is performed with optimum fuel consumption under the first control, the second control is performed to satisfy the requested heat amount and, at the same time, to suppress the deterioration in the fuel-consumption performance as much as possible. Thus, by switching control between the first control and the second control, satisfactory balance can be achieved between the suppression of the deterioration in the fuel consumption and a heat utilization request.

It has been so configured that a comparison is made between the cooling water heat amount (overlap maximum heat amount) QM and a requested heat amount. As a result of the comparison, if the requested heat amount is equal to or smaller than the overlap maximum heat amount QM, the first control has been performed, and if the requested heat amount is larger than the overlap maximum heat amount QM, the second control has been performed. Thus, a preferable determination can be made regarding which of the first and the second controls should be used for the waste heat control.

It has been so configured that a comparison is made between the cooling water heat amount (maximally-ignition-advanced heat amount) QN at the maximally-ignition-advanced timing, which amount corresponds to the overlap angle before the increase of the heat amount, and a requested heat amount. As a result of the comparison, if the requested heat amount is smaller than the maximally-ignition-advanced heat amount, the overlap angle has been changed in an increasing manner, and if the requested heat amount is larger than the maximally-ignition-advanced heat amount, the overlap angle has been changed in a decreasing manner. In this way, the deterioration in the fuel consumption can be suppressed, while a heat utilization request can be realized.

Second Embodiment

The present invention is not limited to the contents of the description of the first embodiment set forth above, but may be modified and implemented as set forth below. This modification is described as a second embodiment, with reference to FIGS. 13 and 14.

In the present embodiment, the ECU 40 performs the control described below.

Figure 13:
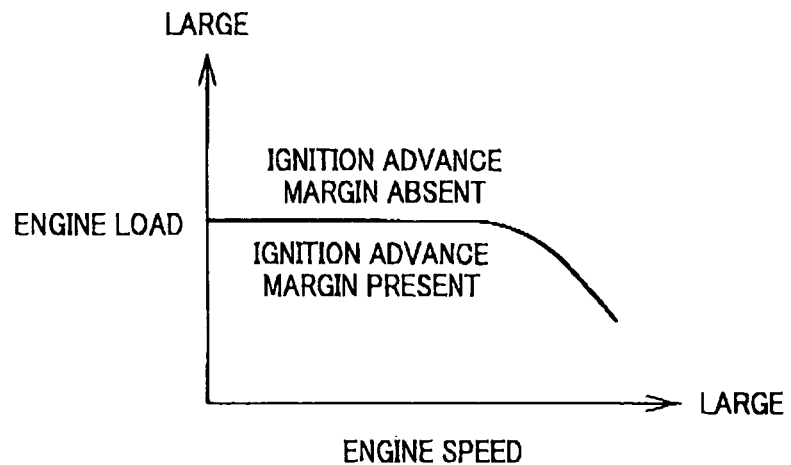
FIG. 13 is a diagram illustrating presence/absence of an ignition advance margin at ignition timing, according to a second embodiment of the apparatus for controlling the amount of waste heat of an engine of the present invention.

Specifically, it is determined whether or not there is an ignition advance margin so that the ignition timing can be controlled to fall on the ignition advance side with reference to the maximum-efficient timing (MBT or close to MBT). If it is determined that there is an ignition advance margin, waste heat control is performed under the first control and the second control. The presence or absence of the ignition advance margin depends on the engine driving condition. For example, as shown in FIG. 13, the presence or absence of ignition advance margin depends on the engine load. Specifically, when the engine load is in a predetermined low-load region, the MBT is on the ignition retard side with reference to the knock limit, and hence the ignition timing can be controlled on the ignition advance side with reference to the MBT. In other words, an ignition advance margin is present. On the other hand, in a high-load region in which the load is higher than that in the predetermined low-load region, the ignition advance is restricted by the knock limit, and hence the ignition timing cannot be controlled on the ignition advance side with reference to the MBT. Accordingly, for example, when the engine load is in the predetermined low-load region, engine waste heat control is performed under the first control and the second control.

When waste heat control is performed depending on the ignition advance margin at the ignition timing, the overlap angle is changed in an increasing manner in the absence of the ignition advance margin to thereby increase the engine waste heat. At the same time, the ignition timing is shifted to the ignition retard side with reference to the maximum-efficient timing in the overlap angle after being changed in an increasing manner. As described above, when the ignition timing is on the ignition retard side with reference to the MBT, the amount of generated waste heat is increased as the ignition timing is shifted more to an ignition retard side. Also, similar to the case where the ignition timing is on the ignition advance side with reference to the MBT, when the same amount of waste heat is to be generated, the fuel consumption will be more improved as the overlap angle is increased. Accordingly, the above configuration can suppress the deterioration in the fuel consumption as much as possible, which deterioration accompanies the increase of the engine waste heat amount in the case where there is no ignition advance margin for the ignition timing.

In the configuration for performing waste heat control depending on the ignition advance margin at the ignition timing, waste heat control cannot be performed with the minimum fuel consumption in the absence of the ignition advance margin. Therefore, no increase of waste heat amount may be performed in the configuration. In other words, it may be so configured that, in response to a heat utilization request, the first and second controls are performed only when the ignition advance margin is present at the ignition timing to thereby increase the waste heat amount.

If the cooling water heat amount is insufficient in spite of performing the waste heat control based on the first and second controls, i.e. if the cooling water heat amount that matches the requested heat amount cannot be obtained even when the ignition timing is shifted to the maximally-ignition-advanced timing, the waste heat control can be performed by shifting the ignition timing to the ignition retard side with reference to the MBT. In this case, when the requested heat amount cannot be satisfied, the overlap angle is changed in an increasing manner, and the ignition timing is shifted to the ignition retard side with reference to the maximum-efficient timing in the overlap angle after being changed in an increasing manner. This configuration is effective when the maximum value of the recoverable cooling water heat in the state where the ignition timing is shifted to the ignition retard side with reference to the MBT is larger than the maximum value in the state where the ignition timing is shifted to the ignition advance side.

When the engine waste heat amount (cooling water heat amount) is to be increased, the generated heat amount is gradually increased under the first and second controls up to the level at which the cooling water heat amount matches the heat amount of the heat utilization request (the amount of heat to be ultimately generated). Specifically, the generated heat amount is gradually increased along the relationship R1 between ignition timing and cooling water heat amount in the maximally-overlapped angle and the relationship R2 between maximally-ignition-advanced timing and cooling water heat amount in the individual overlap angles. When waste heat control is performed, the engine output is lowered due to the waste heat control. Thus, in order to suppress a drastic change in the engine output, the cooling water heat amount may be increased stepwise by a predetermined amount so that the heat amount of the heat utilization request is satisfied. In this case, the cooling water heat amount is increased along the relationships R1 and R2 mentioned above. As a result, deterioration in the fuel consumption can be favorably suppressed while the engine waste heat amount can be brought to a desired level.

Figure 14:
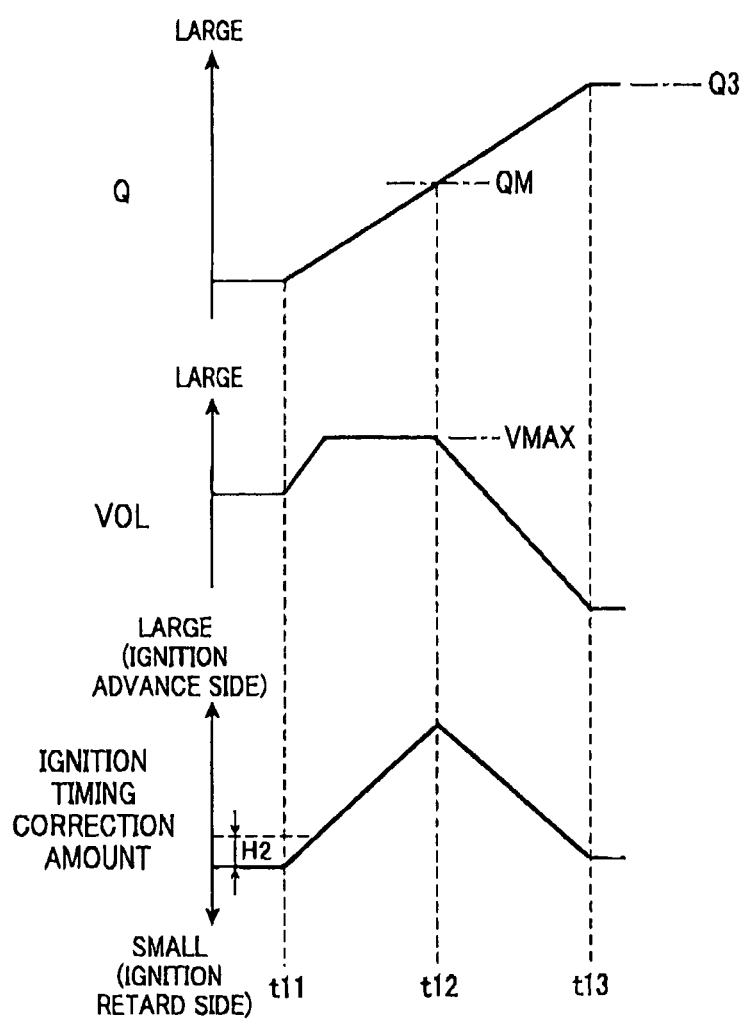
FIG. 14 is a time diagram illustrating a specific mode of the second embodiment.

FIG. 14 is a time diagram specifically illustrating a mode of the present waste heat control processes. Referring to FIG. 14, let us discuss a case where the engine driving condition before the increase of heat amount is controlled with the maximum-efficient timing IM2 on the line L2, and the cooling water heat amount is increased from a value Q0 to a value Q3 via a value Q2 under this control.

In FIG. 14, when a heating request is issued at timing t11, the overlap angle VOL is changed so as to be increased up to a maximum value, while the ignition timing is shifted to the ignition advance side by an amount corresponding to the ignition advance correction amount H1. Further, the ignition timing is shifted to the ignition advance side in order that the cooling water heat amount is increased stepwise by a predetermined amount up to the requested heat amount (Q3). Then, when the ignition timing coincides with the maximally-ignition-advanced timing IG5 in the maximally-overlapped angle, the cooling water heat amount Q will reach the level QM. At this timing t12, i.e. the timing when the cooling water heat amount Q has reached the level QM, the overlap angle VOL is decreased in turn, and the ignition timing is shifted to the ignition retard side. Thus, the cooling water heat amount Q reaches the requested value Q3.

(Modifications)

In the first control described above, it has been so configured that the overlap angle is set to the maximum value VMAX, while the ignition timing is shifted to the ignition advance side with reference to the maximum-efficient timing to thereby increase the cooling water heat amount. Alternatively, however, the overlap angle may be smaller than the maximum value VMAX if only the overlap angle is of an increase-side value compared to the overlap angle before the increase of the heat amount. In this case as well, an effect of increasing the cooling water heat amount can be achieved with the deterioration in the fuel consumption being suppressed.

In the embodiments described above, it has been so configured that the engine waste heat amount is increased under the first and second controls. Alternatively, however, only either of the first and second controls may be performed to increase the engine waste heat amount.

It has been described referring to FIG. 3 that, in the waste heat control, the valve overlap angle is changed by controlling the valve-opening period of the exhaust valve with the use of the exhaust-side valve actuation mechanism 19. Alternatively, however, it may be so configured that the valve overlap angle is changed by changing the valve-opening period of the intake valve with the use of the valve actuation mechanism 18. Alternatively, it may be so configured that the valve overlap angle is changed by controlling the valve-opening period of the intake valve and the valve opening period of the exhaust valve with the use of the valve actuation mechanisms 18 and 19.

Third Embodiment

With reference to FIGS. 15 to 19, hereinafter is described a waste heat control system (waste heat reuse system) to which is applied an apparatus for controlling waste heat of an engine according to a third embodiment of the present invention. In the third embodiment, those components which are identical with or equivalent to those explained referring to FIG. 1 are designated with the same references to omit or simplify the explanation.

Figure 15:
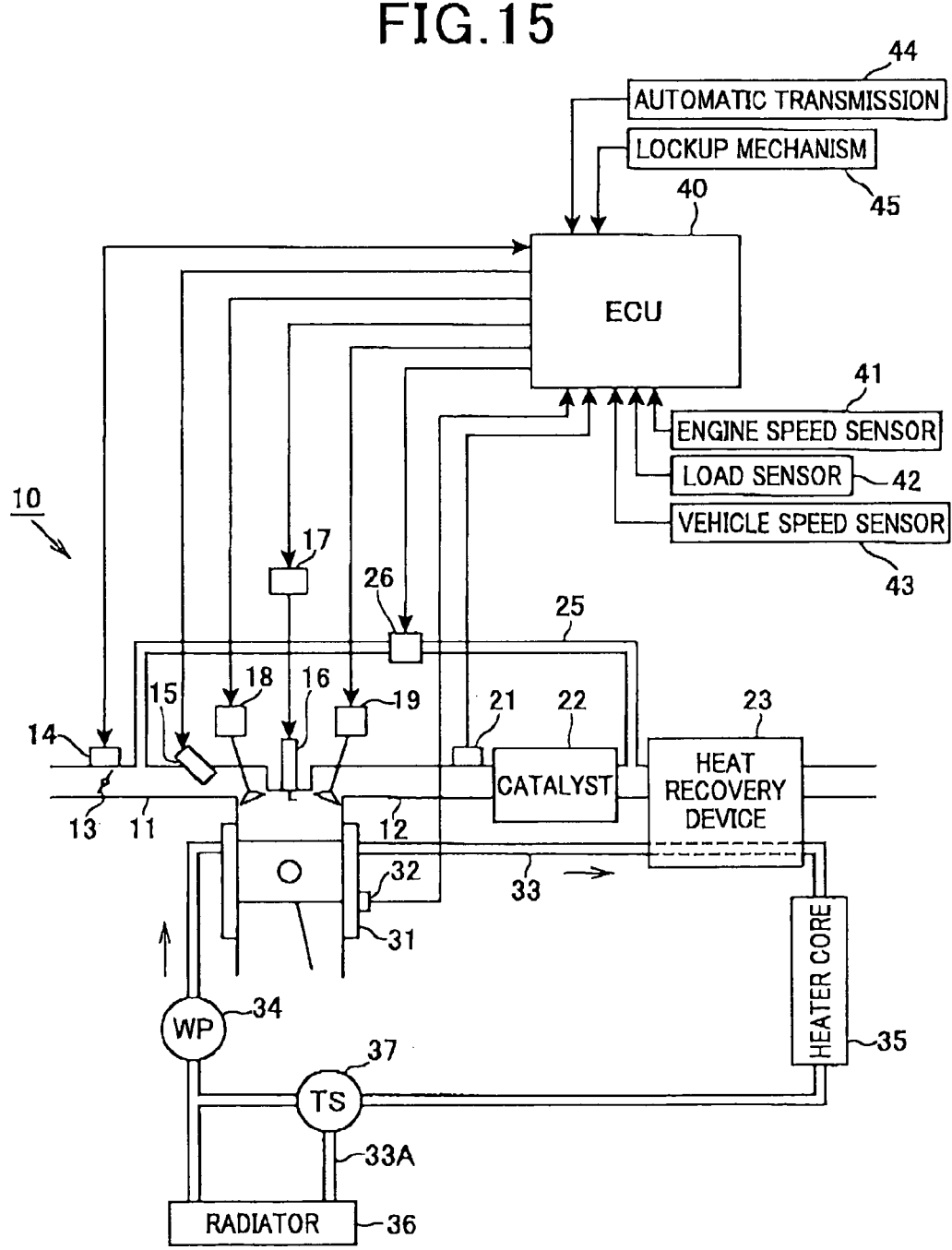
FIG. 15 is a schematic diagram illustrating a waste heat control system to which is applied an apparatus for controlling the amount of waste heat of an engine, according to a third embodiment of the present invention.

FIG. 15 is a schematic block diagram illustrating a general configuration of the waste heat control system. To describe from the aspect of the components, this waste heat control system is additionally incorporated with an EGR piping 25, electromagnetic EGR valve 26, a vehicle speed sensor 43, an automatic transmission 44 and a lockup mechanism 45.

The following description is given focusing on the points different from the configuration illustrated in FIG. 1. As shown in FIG. 15, the present system is provided with an EGR device (exhaust recirculation device) to partially introduce exhaust air as an EGR gas into an intake system. Specifically, the EGR piping 25 is provided between the intake pipe 11 and the exhaust pipe 12. The EGR piping 25 has one end which is connected to a downstream side of the throttle valve in the intake pipe 11 and the other end which is connected to a downstream side (or may be an upstream side) of the catalyst in the exhaust pipe 12. The electromagnetic EGR valve 26 is provided midway in the EGR piping 25. In this case, the amount of EGR gas is ensured to be regulated in an increasing or decreasing manner by regulating the opening of the EGR valve 26.

The ECU 40 is inputted not only with a detection signal from the vehicle speed sensor 43, but also with a detection signal indicating a gear change condition of the automatic transmission 44 which is connected to the output shaft of the engine 10. Further, the ECU 40 is also inputted with a detection signal indicating a lockup condition of the lockup mechanism 45 which is provided between the engine 10 and the automatic transmission 44.

In the present control system, the fuel consumption of the entire system is intended to be improved by recovering and reusing heat energy (energy other than the kinetic energy) that would correspond to a heat loss, among the fuel combustion energy caused by combusting fuel in the engine 10. Thus, waste heat control of the engine 10 is performed based on each heat utilization request and each engine driving condition.

In the present embodiment, in particular, the engine heat efficiency during engine operation is intentionally lowered for the increase of the engine waste heat amount to thereby satisfy a heat utilization request that has been issued such as with heating. Thus, utilization of waste heat for heating, for example, is ensured to be accelerated by an amount corresponding to the increase of the waste heat amount. The engine heat efficiency is an index that indicates how much of the combustion heat energy has been converted to an engine output (useful work). The engine heat efficiency is also referred to as engine operating efficiency (engine shaft efficiency).

More specifically, multiple control modes are set with different engine heat efficiency characteristics being imparted. At the same time, a controlled variable map is prepared to calculate an engine controlled variable for every control mode. Thus, a control mode is ensured to be switched based on a requested heat amount suitable for each heat utilization request. Regarding the control modes, three control modes can be envisioned, for example, for ignition timing control. The control modes include a first control mode in which are set heat efficiency characteristics with the best engine heat efficiency (=fuel consumption), and second and third control modes in each of which are set heat efficiency characteristics with lower heat efficiency than that in the first control mode. From the view point of heat efficiency, the heat efficiency in these three control modes is decreased on the whole in the order of first control mode→second control mode→third control mode. From the view point of waste heat amount, the waste heat amount in these three control modes is increased on the whole in the order of first control mode→second control mode→third control mode. As the multiple control modes, two control modes, or four or more control modes may be set.

Any of the following approaches can be taken for decreasing heat efficiency (increasing waste heat amount).

(1) Heat efficiency is decreased (waste heat amount is increased) by retarding the ignition timing under ignition timing control.
(2) Heat efficiency is decreased (waste heat amount is increased) by shifting valve-opening timing of the intake valve to the ignition advance side (i.e. by opening the intake valve at an earlier stage) under valve-opening control for the intake valve.
(3) Heat efficiency is decreased (waste heat amount is increased) by shifting the valve-opening timing of the exhaust valve to the ignition retard side (i.e. by opening the exhaust valve at a later stage) under valve-opening control for the exhaust valve.

Heat efficiency may be decreased (waste heat amount may be increased) by combining the above approaches (1) to (3).

As explained above, there is a difference in the heat efficiency or in the waste heat amount between the first to third control modes. For example, the amount of generated heat is increased in a high-load operating status of an engine, and hence a sufficient amount of waste heat can be ensured under the engine control that can optimize the engine heat efficiency. Therefore, there is no necessity of decreasing the heat efficiency on purpose in a high-load region of the engine in the second and third control modes. In this regard, in the three control modes, difference in the engine controlled variable between the modes is eliminated in a predetermined high-load region, so that substantially the same control is ensured to be performed.

Figures 16A, 16B, 16C:
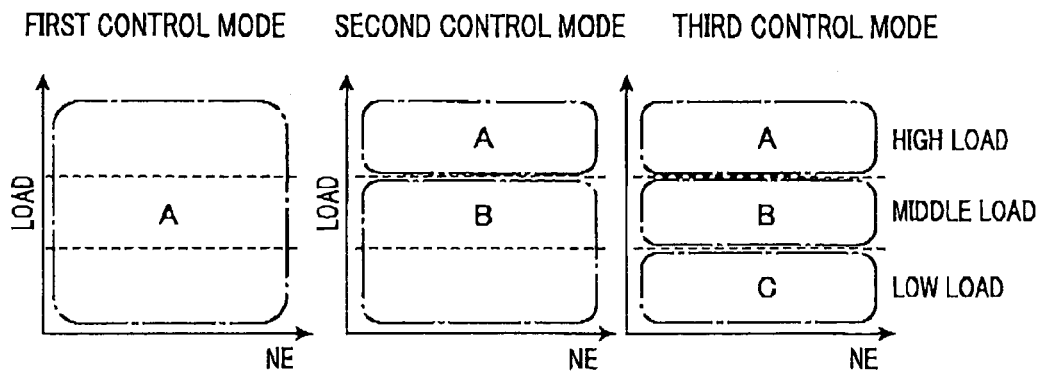
FIGS. 16A to 16C are diagrams each illustrating heat efficiency characteristics set for each engine operating region in first to third control modes.

Referring to FIGS. 16A to 16C, hereinafter are described differences in the heat efficiency characteristics between the first to third control modes, the heat efficiency characteristics being set to each of predetermined engine operating regions. In each of FIGS. 16A to 16C, the horizontal axis indicates engine speed (NE) and the vertical axis indicates engine load. Here, in particular, an engine operating region is divided, depending on the operating load, into a low-load region, a middle-load region and a high-load region, to describe the differences in the heat efficiency characteristics of engine control between these load regions. In the figures, A, B and C indicate differences in the heat efficiency, with the heat efficiency becoming lower in the order of "A>B>C".

In FIGS. 16A to 16C, the thresholds dividing the low-, middle- and high-load regions are indicated as being constant irrespective of the engine speed. However, the thresholds may be changed according to the engine speed, or, in other words, the boundary values of the low-, middle- and high-load regions may be changed according to the engine speed. For example, the high-load region may be broadened as the engine speed is increased.

As shown in FIG. 16A, under the first control mode, heat efficiency characteristics are set to "A" in any of the low-, middle- and high-load regions of the engine. Thus, basically, engine control is ensured to be performed with maximum heat efficiency in any of the load regions. Further, as shown in FIG. 16B, under the second control mode, heat efficiency characteristics are set to "A" in the high-load region of the engine, and heat efficiency characteristics are set to "B" in the low- and middle-load regions. Thus, engine control is ensured to be performed in the high-load region with the same heat efficiency as in the first control mode, while engine control is ensured to be performed in the low- and middle-load regions with the heat efficiency lower than that in the first control mode. In other words, in the second control mode, the waste heat amount is intended to be increased in the low- and middle-load regions compared to the first control mode.

Further, as shown in FIG. 16C, in the third control mode, the heat efficiency characteristics are set to "A" in the high-load region of the engine, "B" in the middle-load region, and "C" in the low-load region. Thus, engine control is ensured to be performed in the high-load region with the same heat efficiency as that in the first control mode, in the middle-load region with the same heat efficiency as that in the second control mode, and in the low-load region with the heat efficiency lower than that in the second control mode. In other words, in the third control mode, the waste heat amount is intended to be increased in the low- and middle-load regions compared to the first control mode. The waste heat amount is intended to be increased in the low-load region in particular compared to either the first or second control mode.

Of the heat efficiency characteristics of the control modes shown in FIGS. 16A to 16C, those of the first to third control modes are the same in the high-load region, and those of the second and third control modes are the same in the middle-load region.

In switching control mode of an engine, there is a concern that a shock or the like may be caused accompanying the variation in the generated torque (torque difference) to thereby deteriorate drivability. In this regard, in the present embodiment, it is ensured that the control mode is not switched immediately upon the issuance or cancellation of a heat utilization request, but the switching timing of control mode is delayed based on each engine driving condition after the issuance or cancellation of the heat utilization request. Thus, drivability is suppressed from being deteriorated with the switching of control mode.

As described referring to FIGS. 16A to 16C, the first to third control modes in the present embodiment have engine operating regions whose heat efficiency characteristics are the same between different control modes. Making use of this fact, mode switching is ensured to be performed between control modes having the same heat efficiency characteristics in an engine operating region where multiple control modes with the same heat efficiency characteristics are present. Thus, after switching control modes, the same control is continuingly performed without substantially changing the heat efficiency characteristics, whereby deterioration in the drivability can be suppressed, which accompanies the mode switching.

Specifically, when the engine driving condition resides in the high-load region, mode switching is allowed for any of the control modes because the heat efficiency characteristics are the same between the first to third control modes. When the engine driving condition resides in the middle-load region, mode switching is allowed only for second control mode a third control mode. When the engine driving condition resides in the low-load region, mode switching is allowed for none of the control modes.

More specifically, the high-load region corresponds to an operating region where the heat efficiency characteristics become the same between the three control modes, i.e. an allowance region where mode switching is allowed for any of the control modes. The low-load region corresponds to an operating region where heat efficiency characteristics are different between the three control modes, i.e. a non-allowance region where mode switching is allowed for none of the control modes. The middle-load region corresponds to an allowance region where mode switching is allowed for second control mode a third control mode and corresponds to a non-allowance region where mode switching is not allowed for first control mode a second and third control modes.

Figure 17:
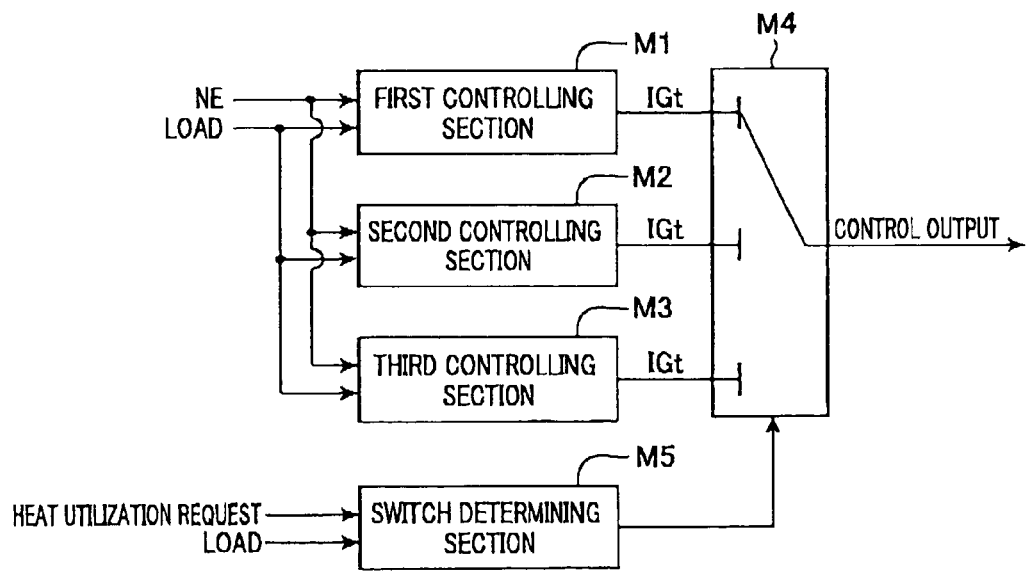
FIG. 17 is a schematic functional block diagram illustrating waste heat control.

FIG. 17 is a schematic functional block diagram illustrating waste heat control in the present embodiment. In FIG. 17, ignition timing control is used as the engine control. The functions shown in FIG. 17 are realized by the ECU 40.

In FIG. 17, a first controlling section M1, a second controlling section M2 and a third controlling section M3 perform the engine control in the first to third control modes described above, respectively. Specifically, the first to third controlling sections M1 to M3 each calculate an ignition timing IGt as an engine controlled variable, based on the engine speed (NE) and the engine load (e.g., any of the intake air amount, intake pipe negative pressure and the throttle opening) as engine driving conditions. In this case, the first controlling section M1 calculates the ignition timing IGt using an ignition timing map prepared based on the heat efficiency characteristics of FIG. 16A. The second controlling section M2 calculates the ignition timing IGt using an ignition timing map prepared based on the heat efficiency characteristics of FIG. 16B. The third controlling section M3 calculates the ignition timing IGt using an ignition timing map prepared based on the heat efficiency characteristics of FIG. 16C.

A mode switching section M4 performs switching to control the actual ignition timing based on any one of the ignition timings IGt calculated by the first to third controlling sections M1 to M3. The mode switching section M4 performs switching between the first to third controlling sections M1 to M3, i.e. performs switching between control modes, based on a switching command from a switching determining section M5. An ignition timing command value in a control mode switched (selected) by the mode switching section M4 is outputted to an igniter. In this way, ignition is performed for the air-fuel mixture in a cylinder at desired ignition timing.

The switching determining section M5 issues a switching command based on a heat utilization request, such as a heating request, and an engine load. Specifically, after the issuance or cancellation of the heat utilization request, the switching determining section M5 commands switching between the controlling sections M1 to M3, i.e. switching between control modes, based on engine load information. In performing switching between control modes, the switching determining section M5 is adapted to appropriately delay switching timing of control mode based on the engine driving conditions. In the present embodiment, the first to third controlling sections M1 to M3 correspond to the "controlling means", and the mode switching section M4 and the switching determining section M5 correspond to the "mode switching means".

The heat utilization request includes, for example, a heating request or a catalyst warm-up request. A heating request is issued when the vehicle cabin is to be heated, with the operation of a vehicle occupant or with the control command issued under the automatic air conditioning control. A catalyst warm-up request is issued when the catalyst 22 of the exhaust pipe 12 is in a low-temperature state, i.e. at the time of cold startup of the engine 10 or at the time of temporary temperature decrease during vehicle operation. For example, in a system that performs idle stop control (automatic stop/restart control) of the engine 10, the temperature of the catalyst is considered to be decreased during idle stop. In such a case, a catalyst warm-up request is made after the engine has been restarted.

Figure 18A:
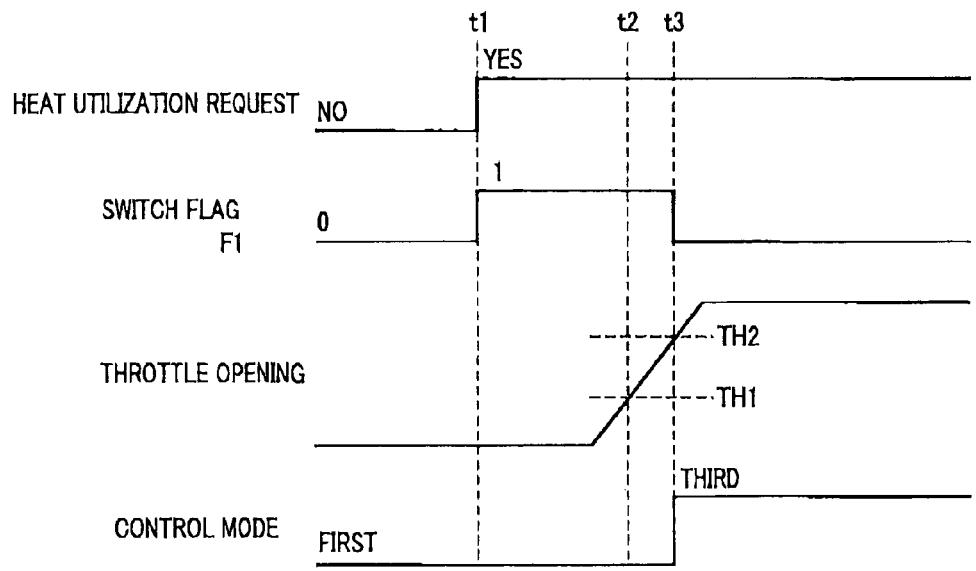
FIGS. 18A and 18B are schematic explanatory time diagrams each illustrating mode switching control.
Figure 18B:
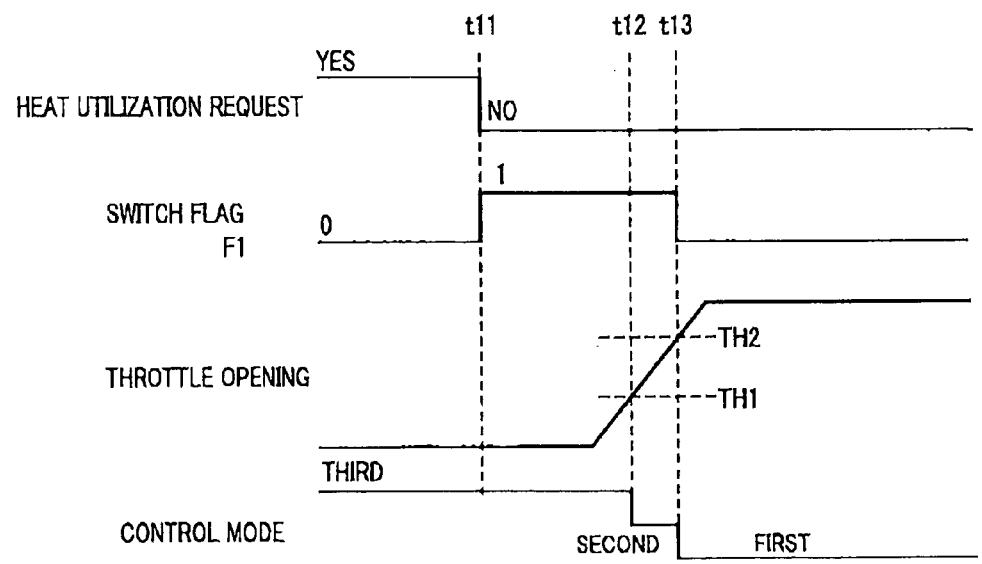

Referring now to time diagrams of FIGS. 18A and 18B, hereinafter is described an outline of mode switching control under which control mode is switched according to a heat utilization request. FIG. 18A shows the case where a heat utilization request has been issued. FIG. 18B shows the case where a heat utilization request has been cancelled.

In FIG. 18A, the first control mode is effected prior to timing t1, and the engine operating load resides in the low-load region (e.g., the throttle opening is less than a threshold TH1). Under these conditions, when a heat utilization request, such as a heating request, is issued at the timing t1, the first control mode is switched to a control mode (the second or third control mode) in which the engine waste heat amount is larger than that in the first control mode. Here, the first control mode is assumed to be switched to the third control mode. However, since the engine load at the timing t1 is low, switching from the first control mode to a different control mode corresponds to the switching between control modes having different heat efficiency characteristics, i.e. corresponds to the switching from the heat efficiency characteristics A to the heat efficiency characteristics B in FIGS. 16A to 16C. Accordingly, control mode is not switched at the timing t1 so that the deterioration in the drivability accompanying the switching of control mode can be avoided.

After that, as the throttle opening is increased with the operation of the accelerator, the engine load turns to a middle load (the throttle opening becomes equal to or more than the threshold TH1) at timing t2, and further turns to a high load (the throttle opening becomes equal to or more than a threshold TH2) at timing t3. In this case, switching from the first control mode to a different mode is not performed at the timing t2 in the middle-load region because this switching again corresponds to the switching between control modes having different heat efficiency characteristics (switching A→B in the heat efficiency to characteristics of FIGS. 16A to 16C). In contrast, switching from the first control mode to a different control mode in the high-load region corresponds to the switching between control modes having the same heat efficiency characteristics (switching A→A in the heat efficiency characteristics of FIGS. 16A to 16C). Therefore, the first control mode is switched to the third control mode at the timing t3. In this case, the switching timing (t3) for the control mode has been delayed from the timing (t1) of the issuance of the heat utilization request.

A switch flag F1 is provided to determine completion of switching of control mode after the issuance of a heat utilization request. The switch flag F1 is set to "1" (timing t1 of FIG. 18A) with the issuance of a heat utilization request and cleared to "0" (timing t3) at the time point when switching has been completed from a certain control mode to a different control mode that satisfies each heat utilization request.

To explain in more detail, if the engine load is high at the time point (timing t1) when a heat utilization request has been issued, switching of control mode (switching of first control mode→second or third control mode) is immediately performed without delaying the switching timing.

With reference to the issuance timing of a heat utilization request, control mode is not immediately switched but the switching timing is delayed. Accordingly, the period between the timings t1 and t3 corresponds to a delay time for switching control mode (for the increase of the engine waste heat amount). However, since the engine waste heat of a certain level has been ensured if the engine is in operation, a little delay in switching control mode is not considered to cause discomfort to the vehicle occupants.

Referring to FIG. 18B, hereinafter is described control mode switching in the case where a heat utilization request is cancelled. It is assumed here that switching is performed from the third control mode to the first control mode and that the engine load is low at timing t11 when the heat utilization request is cancelled.

When a heat utilization request is cancelled at the timing t11, the third control mode is switched to a different control mode, from the timing t11 onward, in which the engine waste heat amount is smaller than that in the third control mode. In this case, since the engine load is low at the timing t11, switching from the third control mode to a different control mode corresponds to switching to a control mode having different heat efficiency characteristics (switching C→A or B in the heat efficiency characteristics of FIGS. 16A to 16C). Accordingly, control mode is not switched at the timing t11 so that deterioration in the drivability accompanying switching of control mode can be avoided.

After that, when the throttle opening is increased with the operation of the accelerator, for example, the engine load turns to middle load (the throttle opening becomes equal to or more than the threshold TH1) at timing t12, and further at timing t13, the engine load turns to high load (the throttle opening becomes equal to or more than the threshold TH2). In this case, switching from the third to second control mode in the middle-load region corresponds to switching between control modes having the same heat efficiency characteristics (switching B→B in the heat efficiency characteristics of FIGS. 16A to 16C). Accordingly, switching from the third to second control mode is carried out at the timing 12t. Further, switching from the second to first control mode in the high-load region again corresponds to switching between control modes having the same heat efficiency characteristics (switching A→A in the heat efficiency characteristics of FIGS. 16A to 16C). Accordingly, switching from the second to first control mode is carried out at the timing t13. Thus, the switching timings (t12 and t13) of control mode have been delayed for the cancellation timing (t11) of the heat utilization request.

The switch flag F1 is set to "1" with the cancellation of the heat utilization request (timing t11 of FIG. 13B), and cleared to "0" at the time point when switching of control mode has been completed (timing t13).

Figure 19:
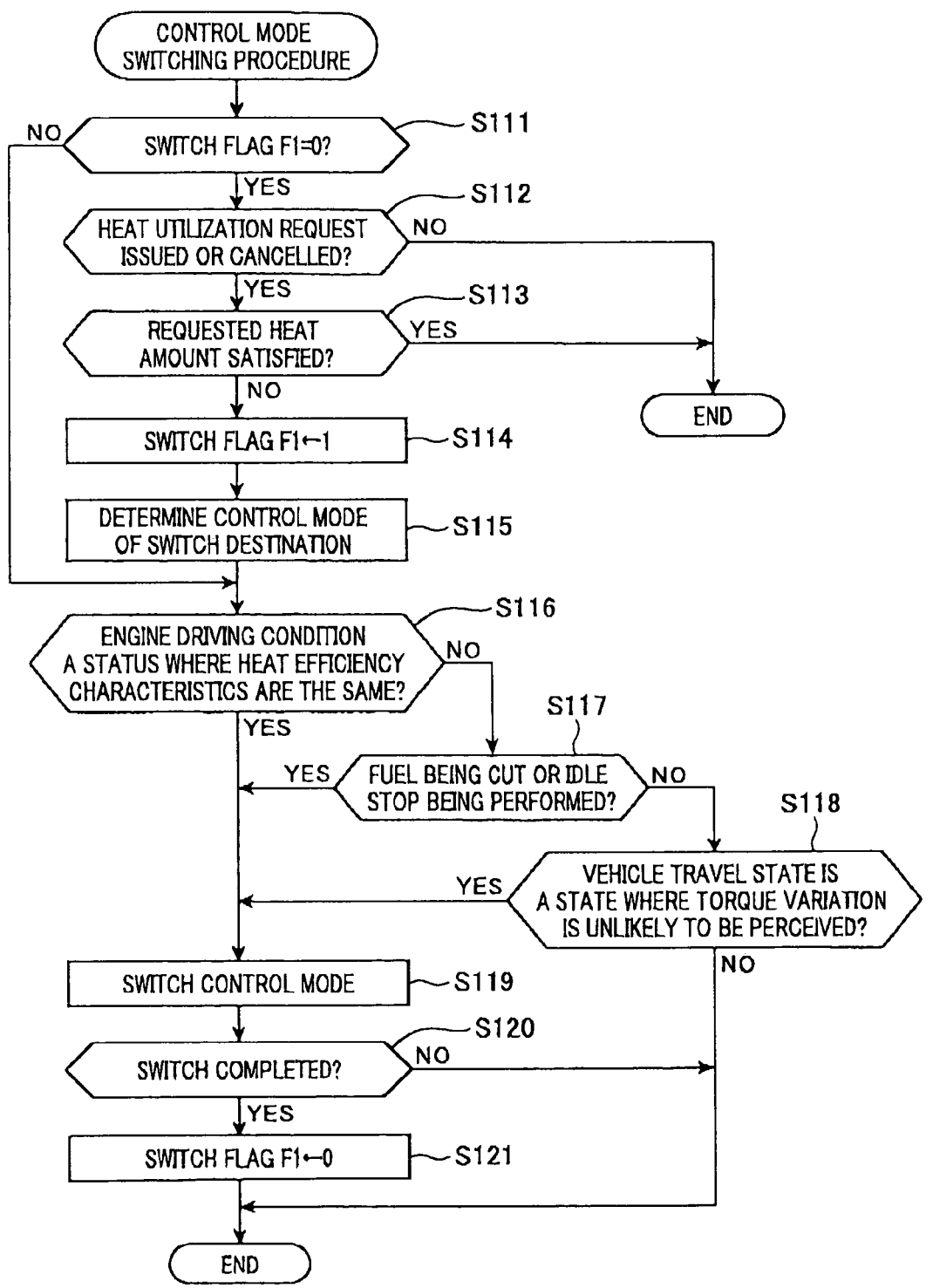
FIG. 19 is a flow diagram illustrating a switching procedure in a control mode.

FIG. 19 is a flow diagram illustrating a control mode switching procedure for waste heat control. Processes in the procedure are repeatedly executed by the ECU 40 at a predetermined cycle.

In FIG. 19, at step S111, it is determined whether or not the switch flag F1 is "0". If F1=0, i.e. if the time then does not fall within a period starting from the issuance or cancellation of a heat utilization request to the completion of switching control mode, control proceeds to the subsequent step S112. If F1=1, i.e. if the time then falls within a period starting from the issuance or cancellation of a heat utilization request to the completion of switching control mode, control proceeds to step S116 skipping steps in_between.

At step S112, it is determined whether or not the time then corresponds to the timing when a heat utilization request (e.g., heating request or catalyst warm-up request) has been issued, or corresponds to the timing when the heat utilization request has been cancelled. At the subsequent step S113, it is determined whether or not a requested heat amount of the moment can be satisfied under the engine control based on the control mode currently underway. At step S113, if the time then corresponds to the timing of issuance of a heat utilization request, it is determined whether or not control mode is required to be switched to a different control mode with a waste heat amount larger (with a heat efficiency lower) than the control mode currently underway. If the time then corresponds to the timing of cancellation of a heat utilization request, it is determined whether or not control mode is required to be switched to a different control mode with a waste heat amount smaller (with a heat efficiency higher) than the control mode currently underway.

If the determination results in YES at step S112 and NO at step S113, control proceeds to the subsequent step S114. If the determination results in NO at step S112 or YES at step S113, the present procedure is immediately ended.

At step S114, the switch flag F1 is set to "1". At the subsequent step S115, it is determined to which control mode the control mode currently underway should be switched with the issuance or cancellation of the heat utilization request this time. At step S115, if the time then corresponds to the timing of issuance of a heat utilization request, a control mode with a waste heat amount larger (with a heat efficiency lower) than the control mode currently underway is determined as a switching destination control mode. Also, if the time then corresponds to the timing of cancellation of a heat utilization request, a control mode with a waste heat amount smaller (with a heat efficiency higher) than the control mode currently underway is determined as a switching destination control mode.

Then, at steps S116 to S118, it is determined whether or not conditions for performing control mode switching are met.

Specifically:

At step S116, it is determined whether or not the current engine driving condition allows for switching between the control modes having the same heat efficiency characteristics (whether or not the current engine driving condition is in a region that allows for or does not allow for mode switching).

At step S117, it is determined whether or not fuel is being cut or idle stop is being performed. It should be appreciated that fuel cut is performed during deceleration of a vehicle, and that idle stop is performed when predetermined automatic stopping conditions are met under idle stop control.

At step S118, it is determined whether or not variation in the vehicle travel conditions caused by torque variation accompanying control mode switching, is perceivable by the vehicle occupants. For example, it is determined whether or not any one of the following conditions is met, i.e. the condition where the vehicle concerned is either in acceleration or deceleration, the condition where the automatic transmission 44 is performing a speed-change operation and the condition where the lockup mechanism 45 is in a lockup-off state.

When the determination at any one of steps S116 to S118 is YES, control proceeds to the subsequent step S119. When the determinations at all of steps S116 to S118 are NO, the present procedure is immediately ended.

At step S119, control mode switching is performed based on the switching destination control mode determined at step S15. For example, in this case, when the control mode at the time of cancellation of a heat utilization request is the "third control mode" and when the switching destination control mode is the "first control mode", switching may not necessarily be performed straight as: third control mode→first control mode, but may be performed in the order of: third control mode→second control mode→first control mode as have been explained referring to FIG. 18B.

Then, at step S120, it is determined whether or not switching to the switching destination control mode determined at step S15 has been completed. If switching has been completed, control proceeds to step S121 where the switch flag F1 is cleared to "0".

The present embodiment described above can provide distinguished advantages set forth below.

In performing switching between multiple control modes with different heat efficiency characteristics, the switching timing has been ensured to be appropriately delayed with reference to the issuance or cancellation timing of a heat utilization request. Further, it has been so configured that, after the issuance or cancellation of a heat utilization request, control mode switching is permitted if each engine driving condition falls within an allowable range, and is not permitted if each engine driving condition falls within a non-allowable range.

According to the above configuration, switching has been performed between multiple control modes with different heat efficiency characteristics to thereby realize engine waste heat control according to each heat utilization request. Also, switching timing between the multiple control modes has been ensured to be delayed with reference to the issuance or cancellation timing of a heat utilization request. Accordingly, unlike the configuration in which mode switching is immediately performed upon issuance or cancellation of a heat utilization request, mode switching will not be performed until a favorable condition is available for switching control mode according to each heat utilization request. In this regard, control mode has been ensured to be switched according to which of allowable or non-allowable region each engine driving condition resides. Therefore, control mode can be switched at appropriate timing during engine operation, when torque variation is unlikely to be caused. As a result, waste heat control suitable for a heat utilization request can be performed. Moreover, shock or the like can be mitigated at the time of control mode switching that accompanies the change of a requested heat amount. In this way, improvement can be achieved in the drivability.

More specifically, the allowable range has been ensured to be an operating range (high- or middle-load range in the present embodiment) in which the heat efficiency characteristics of two or more control modes become the same. Control mode has been ensured to be switched, in such an allowable range, between the control modes having the same heat efficiency characteristics. Thus, heat efficiency characteristics will not be changed simultaneously with control mode switching, but instead, heat efficiency characteristics remain unchanged before or after the switching. Accordingly, torque shock that would accompany the change of heat efficiency characteristics can be suppressed.

In the above configuration, control mode is switched in an operating region where heat efficiency characteristics of two or more control modes become the same. In such a configuration, when control mode is switched according to a heat utilization request, the difference in the engine output before and after the switching can be suppressed to a level lower than a predetermined level. Thus, favorable switching of control mode can be realized.

In a high-load region of an engine, all the control modes have been ensured to have the same heat efficiency characteristics. Accordingly, in this high-load region, switching between whichever control modes may be performed, the change is permitted. In particular, in the high-load region, where engine heat efficiency is maximized, heat utilization requests can be handled without deteriorating the engine heat efficiency more than necessary.

It has also been so configured that, after the issuance or cancellation of a heat utilization request, control mode is switched when combustion is suspended in the engine, i.e. during fuel cut or during idle stop. Since torque generation of the engine is interrupted when combustion is suspended in the engine, no problem will be raised if there is a difference in the torque before and after the interruption. Therefore, control mode can be favorably switched when combustion is suspended in the engine.

Further, it has been so configured that control mode is switched after the issuance or cancellation of a heat utilization request even under any one of the conditions where the vehicle concerned is either in acceleration or deceleration, where the automatic transmission 44 is performing a speed-change operation and where the lockup mechanism 45 is in a lockup-off state. A vehicle as a whole is liable to cause torque variation under these conditions. Therefore, the torque variation accompanying control mode switching is unlikely to be perceived by the vehicle occupants under these conditions. In other words, torque variation of the engine, if it occurs at the time of switching control mode, will be imperceptible. Thus, favorable switching of control mode can be realized.

Fourth Embodiment

With reference to FIGS. 20 to 23, hereinafter is described a waste heat control system (waste heat reuse system) applied with an engine waste heat control apparatus according to a third embodiment of the present invention.

The fourth embodiment will be described focusing on the differences from the third embodiment described above. In the above embodiment, control mode has been switched between the control modes having the same heat efficiency characteristics, in an operating region where heat efficiency characteristics of two or more control modes become the same (see FIGS. 16A to 16C and step S16 of FIG. 19). This configuration is change in the present embodiment. Specifically, in the present embodiment, multiple divisions of engine operating region include a first operating region which is defined as an execution region for one control mode among multiple control modes, and a second operating region which is defined as an execution region for two or more control modes among the multiple control modes. Control mode is switched according to a heat utilization request, at the timing when the engine driving condition is transited between these two operating regions.

Figure 20:
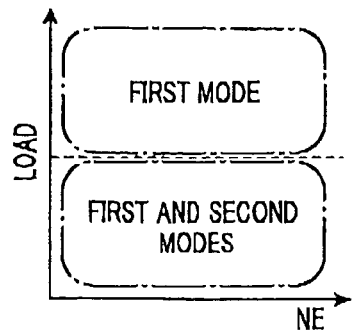
FIG. 20 is a diagram illustrating two engine operating regions in an apparatus for controlling the amount of waste heat of an engine, according to a fourth embodiment of the present invention.

FIG. 20 is a diagram illustrating two engine operating regions, with the horizontal axis indicating engine speed (NE) and the vertical axis indicating engine load. The engine operating region here is divided into a high-load region and a low-load region, according to the difference in the engine load. The high-load region corresponds to the first operating region and the low-load region corresponds to the second operating region.

In the present embodiment, two control modes (first and second control modes) are provided as multiple control modes having different heat efficiency characteristics of the engine. Of the two control modes, the first control mode is set to have heat efficiency characteristics exerting the best engine heat efficiency (=fuel consumption), and the second control mode is set to have heat efficiency characteristics exerting a lower heat efficiency than the first control mode. Also, the high-load region is set as a control execution region where engine control is effected in the first control mode, while the low-load region is set as a control execution region where engine control is effected in the first and second control modes. The high-load region and the low-load region are provided as operating regions adjacent to each other. It should be appreciated that, alternative to this configuration, three or more control modes may be set as the multiple control modes, or the low-load region (second operating region) may be provided as an execution region where three or more control modes are executed.

When a requested heat amount is increased or decreased with the issuance or cancellation of a heat utilization request, the ECU 40 switches control mode at the timing when the engine driving condition is transited from the high-load region to the low-load region, or at the timing when the engine driving condition is transited from the low-load region to the high-load region. More specifically, for example, when the engine waste heat amount is to be increased in the first control mode in response to the issuance of a heat utilization request, control mode is switched (first→second control mode) at the timing when the engine driving condition is transited from the high-load region to the low-load region. Also, when the engine waste heat amount is to be decreased in the second control mode in response the cancellation of a heat utilization request, control mode is switched (second→first control mode) at the timing when the engine driving condition is transited from the low-load region to the high-load region.

Figure 21:
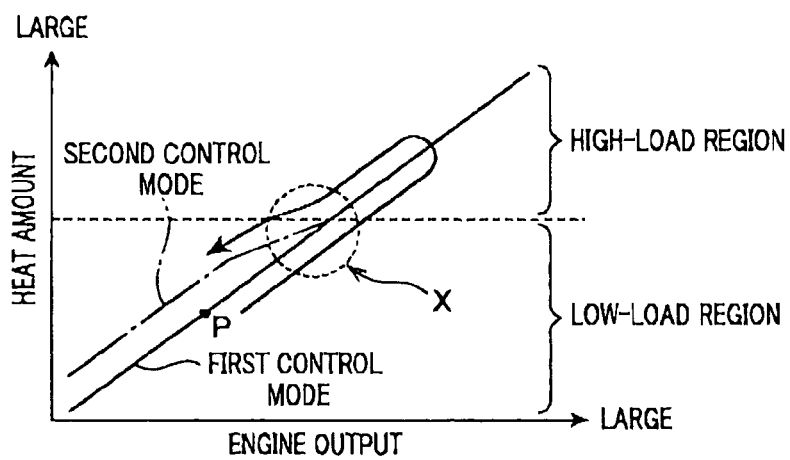
FIG. 21 is a diagram illustrating the relationship between engine output and heat amount in first and second control modes.

FIG. 21 is a diagram illustrating a relationship between engine output and heat amount in the first and second control modes. The figure indicates a relationship in which heat amount is increased as engine output becomes larger. Further, regarding the first control mode (solid line), the figure indicates characteristics that the efficiency is maximized in the high- and low-load regions. Regarding the second control mode (dash-dot line), the figure indicates characteristics that the efficiency is lower (characteristics that heat amount becomes larger) than the first control mode in the low-load region. Let us discuss the case where the engine driving condition is at a level P as indicated in the figure and control mode is switched from the first to second control mode. In this case, in the present embodiment, the status is once transited to the high-load region and then transited back to the low-load region as indicated by an arrow in the figure, followed by control mode switching. In such a case, if mode switching of first→second control mode is performed in the low-load region, this corresponds to mode switching between control modes having different heat efficiency characteristics and thus causes torque variation. On the other hand, if control mode is switched in conformity with the transition to and from the high-load region, torque variation can be suppressed.

In the first and second control modes having an execution region of the low-load region, certain engine output characteristics are retained in the vicinity of the boundary portion between the low- and high-load regions (portion X circled with a broken line in the figure), which characteristics continuously change in relation to the high-load region. Thus, the heat efficiency characteristics can be substantially prevented from changing before and after the switching of control mode, whereby control mode can be smoothly switched. For example, at the boundary portion between the low- and high-load regions, variation in the engine output for a predetermined change of the engine driving condition is ensured to be equal to or less than a preset allowable value.

Figure 22:
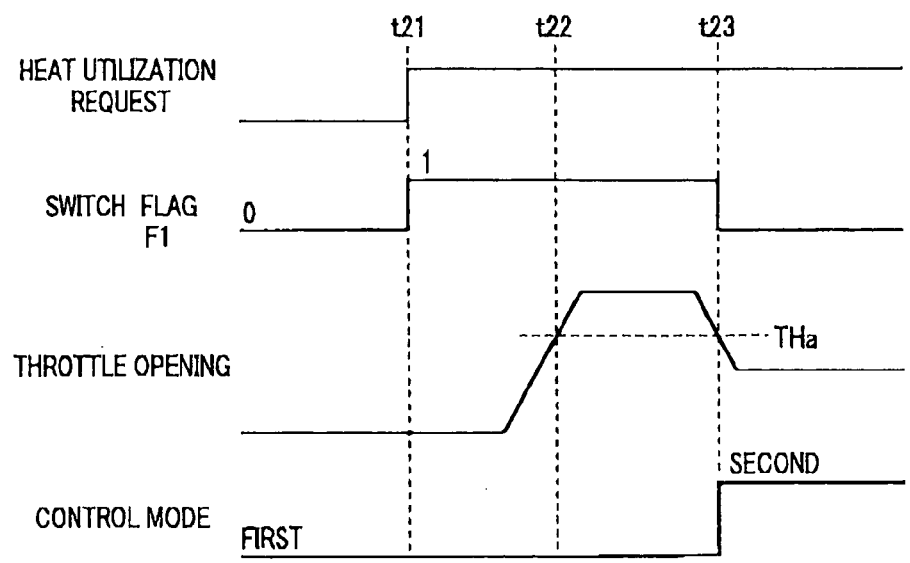
FIG. 22 is a schematic explanatory time diagram illustrating mode switching control according to the fourth embodiment.

With reference to a time diagram of FIG. 22, hereinafter is described an outline of the mode switching control of the present embodiment. FIG. 22 shows an outline in the case where a heat utilization request has been issued.

In FIG. 22, prior to timing t21, the first control mode is effected and the engine operating load resides in the low-load region (e.g., throttle opening is less than a threshold THa). Under these conditions, when a heat utilization request, such as a heating request, is issued at the timing t21, mode is switched, from this timing t21 onward, from the first control mode to the second control mode in which engine waste heat amount is larger than in the first control mode. However, since the engine driving condition resides in the low-load region at the timing t21, switching of control mode at this timing is likely to cause torque variation. Therefore, control mode is not switched at the timing t21.

After that, when the throttle opening is increased with the operation of the accelerator, for example, the engine load will turn high (throttle opening becomes equal to or more than the threshold THa) at timing t22. Since only the first control mode is effective in the high-load region, the first control mode is continuously effected as it stands. Then, when the engine load turns from high to low at timing t23, switching of first→second control mode is permitted. At this time, the switching timing (t23) of control mode has been delayed with reference to the issuance timing (t21) of the heat utilization request.

With reference to the issuance timing of a heat utilization request, control mode is not immediately switched but the switching timing is delayed. Accordingly, the period between the timings t21 and t23 corresponds to a delay time for control mode switching (increase of engine waste heat amount). However, since the engine waste heat of a certain level should be retained if only the engine is in operation, a little delay in the switching of control mode is not considered to give uneasy feeling to the vehicle occupants.

Figure 23:
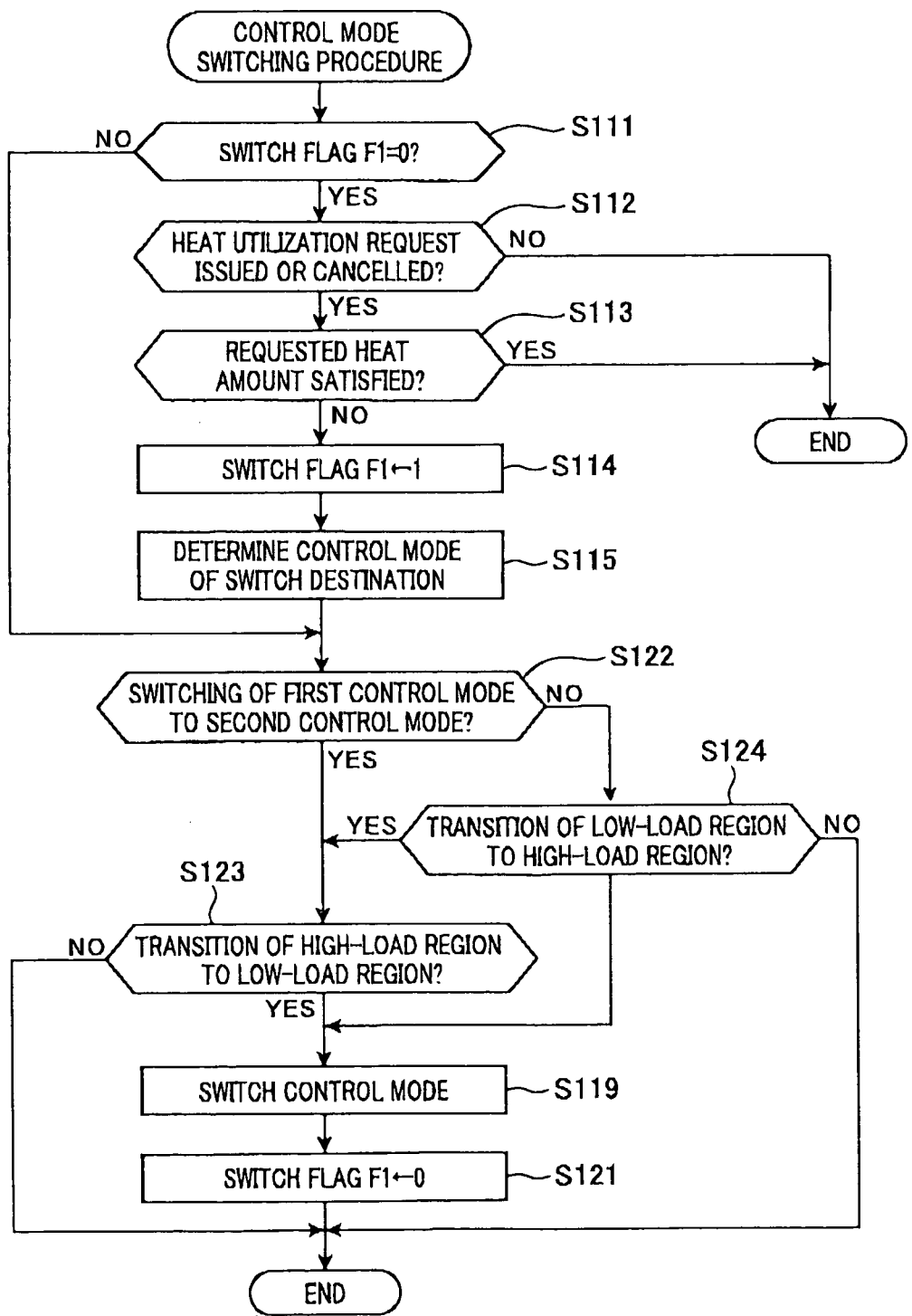
FIG. 23 is a flow diagram illustrating a switching procedure in a control mode according to the fourth embodiment.

FIG. 23 is a flow diagram illustrating a control mode switching procedure for waste heat control. Processes in the procedure are repeatedly performed by the ECU 40 at a predetermined cycle. The processes of FIG. 23 are performed replacing those of FIG. 5. The processes which are the same as those of FIG. 19 are designated with the same references to simplify explanation.

In FIG. 23, the processes at steps S111 to S115 are the same as those of FIG. 19. Specifically, those processes which are set forth below are performed at these steps, i.e. determining whether or not the switch flag F1=0 (S111), determining whether or not the time then corresponds to the timing of issuance or cancellation of a heat utilization request (e.g. heating request or catalyst warm-up request) (S112), determining whether a requested heat amount is satisfied (S113), setting the switch flag F1 (S114), and determining control mode of a switching destination (S115).

Subsequently, at step S122, it is determined whether or not switching of control mode this time corresponds to "first control mode→second control mode". If YES, control proceeds to step S123 and if NO, control proceeds to step S124. In this regard, when the engine waste heat amount is to be increased (when switching of first control mode second control mode is performed) in response to the issuance of a heat utilization request, the process at step S122 results in YES. On the other hand, when the engine waste heat is to be decreased (when switching of second control mode→first control mode is performed) in response to the cancellation of a heat utilization request, the process at step S122 results in NO.

At step S123, it is determined whether or not the engine driving condition of the moment corresponds to a transition "high-load region→low-load region". At step S124, it is determined whether or not the engine driving condition of the moment corresponds to a transition "low-load region→high-load region". If the process at step S123 results in YES or if the process at step S124 results in YES, control proceeds to the subsequent step S119. If the process at either of steps S123 and S124 results in NO, the present procedure is immediately ended.

The processes at steps S119 and S121 are the same as those of FIG. 19. Specifically, the following processes are performed at these steps, i.e. performing switching to a control mode of a switching destination (S119) and clearing the switch flag F1 (S121).

As explained referring to FIG. 19, the following processes may be performed, which are: determining whether or not fuel cut or idle stop is being performed (step S117 of FIG. 19); and determining whether or not the vehicle travel conditions are such that the torque variation accompanying the control mode switching is unlikely to be perceived by the vehicle occupants (step S118 of FIG. 19). Then, control mode may be switched according to the results of these processes. However, these processes are omitted in FIG. 23.

In the second embodiment described so far as well, waste heat control according to a heat utilization request can be performed similar to the first embodiment described above. Moreover, the shock or the like can be mitigated as well when control is switched with the change of a requested heat amount. Thus, improvement in the drivability can be achieved.

Regarding the high-load region (first operating region) that is an execution region of the first control mode and the low-load region (second operating region) that is the execution region for the second control mode, control mode has been ensured to be switched according to a heat utilization request at the time of the transition "high-load region→low-load region" or the transition "low-load region→high-load region". Thus, when a heat utilization request is issued or cancelled, control mode will not be switched until the engine driving condition is transited from high- to low-load region or vice versa. In this case, switching of control mode in response to a heat utilization request will not be performed in the low-load region that is an execution region for two or more control modes, but will be performed in conformity with the transition to and from the high-load region that is an execution region for a single control mode. Thus, heat efficiency characteristics can be ensured to be identical or can be ensured not to substantially cause variation, before and after the switching of control mode. The two or more control modes having the low-load region as an execution region would have different heat efficiency characteristics, and thus torque variation would be caused at the time of switching control mode in the low-load region. In this regard, such torque variation can be suppressed by switching control mode in conformity with the transition to and from the high-load region.

Since the high-load region of the engine will have maximum engine heat efficiency, each heat utilization request can be acted on without lowering the engine heat efficiency more than necessary.

Fifth Embodiment

With reference to FIGS. 24 to 30, hereinafter will be described a waste heat control system (waste heat reuse system) applied with an engine waste heat control apparatus according a third embodiment of the present invention.

The present embodiment will be described focusing on the differences from the third and fourth embodiments described above. In the above embodiments, one or more of the following approaches have been taken to decrease the heat efficiency (increase the waste heat amount): (1) retarding ignition timing; (2) shifting valve opening timing to an ignition advance side under valve-opening-timing control for an intake valve; and (3) shifting valve opening timing to an ignition retard side under valve-opening-timing control for an exhaust valve. In the present embodiment, this configuration is changed. That is, in the configuration of the present embodiment, waste heat is ensured to be increased by combining controls in at least any one of the multiple control modes. Specifically, overlap angle control for changing an overlap angle during an overlap period between a valve-opening period of the intake valve and that of the exhaust valve, is combined with ignition advance control for advancing ignition timing under ignition timing control.

More specifically, in the present embodiment, the first and second control modes of the second embodiment are set as multiple control modes. Of these control modes, the second control mode is configured to increase waste heat with the above overlap angle control and the ignition advance control. In other words, the high-load region is permitted to serve as a control execution region where engine control is performed in the first control mode, while the low-load region is permitted to serve as a control execution region where engine control is performed in the first and second control modes (overlap angle control+ignition advance control) (see FIG. 20). When a requested heat amount is increased in response to the issuance of a heat utilization request, the ECU 40 performs switching from the first control mode to the second control mode (overlap angle control+ignition advance control) at the timing when the engine driving condition is transited from a high-load region to a low-load region. Also, when a requested heat amount is decreased in response to the cancellation of a heat utilization request, the ECU performs switching from the second control mode (overlap angle control+ignition advance control) to the first control mode at the timing when the engine driving condition is transited from a low-load region to a high-load region.

Hereinafter is described in detail the second control mode of the present embodiment.

Under the engine control in the second control mode, waste heat control is performed by changing the overlap angle in an increasing manner with reference to an engine operating point of the moment, in the case of increasing waste heat. At the same time, in the waste heat control, ignition timing is controlled so as to fall on an ignition advance side with reference to maximum-efficient timing (MBT or near MBT) which corresponds to an overlap angle after increase. In the present embodiment, the relationship of overlap angles with maximum-efficient timings IM1 to IM5 of ignition timing and with maximally-ignition-advanced timings IG1 to IG5 is stored in advance in a ROM or the like. Thus, the overlap angle is controlled to be the maximally-efficient overlap angle, i.e. maximally-overlapped angle, which minimizes the fuel consumption of the engine 10 in the case where the ignition timing falls on the maximally-ignition-advanced timings IG1 to IG5. At the same time, according to a requested heat amount, ignition timing is controlled so as to fall on an ignition advance side with reference to the maximum-efficient timing IM5 corresponding to the maximally-overlapped angle. As a result, decrease in heat efficiency (deterioration in fuel consumption) is ensured to be suppressed as much as possible, while a desired amount of engine waste heat is ensured to be generated.

Figure 24:
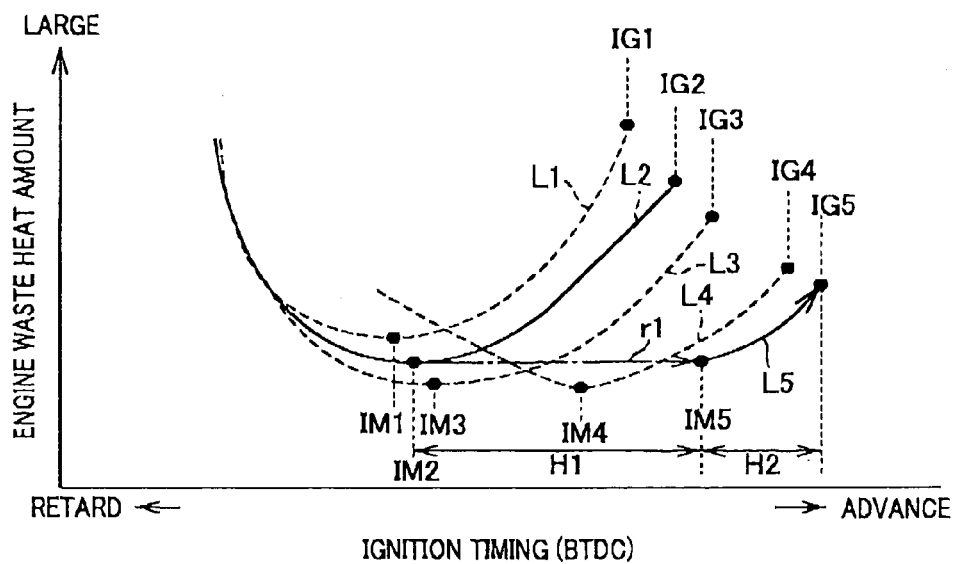
FIG. 24 is a schematic explanatory diagram illustrating waste heat control in the second control mode.

FIG. 24 is a diagram schematically illustrating the waste heat control in the second control mode. In the figure, references L1 to L5 indicate ignition timing characteristics of different overlap angles. It is indicated in the figure that, as the ignition timing characteristics change from L1 to L5, the overlap angle increases. In the figure, with L2 being a reference overlap angle, respective overlap angles increase or decrease on a 10° CA basis. In FIG. 24, an engine driving condition is assumed, regarding the ignition timing, such that the MBT falls on an ignition retard side with reference to a knock limit. Also, in FIG. 24, overlap angle is made variable by shifting the valve-opening period of the exhaust valve to an ignition retard side or an ignition advance side by the exhaust-side valve actuation mechanism 19.

In FIG. 24, L1 to L5 indicate a relationship between ignition timing and engine waste heat amount for respective overlap angles. As indicated by L1 to L5, the ignition timing characteristics are different between the overlap angles. In the overlap angles, respective control ranges of ignition timing correspond to the respective regions sandwiched between maximally-ignition-advanced timings IG1 to IG5 and maximally-ignition-retarded timings. The maximally-ignition-advanced timings IG1 to IG5 correspond to ignition advance limits which are determined by the knock limit or the peak position restriction for cylinder pressure. The maximally-ignition-retarded timings correspond to ignition retard limits which are determined to limit torque variation. Comparing the maximally-ignition-advanced timings IG1 to IG5 with each other in the respective overlap angles, the maximally-ignition-advanced timings are permitted to fall more on the ignition advance side as the overlap angles become larger.

L1 to L4 are indicated with downward convex curves in the control ranges of ignition timing. Specifically, the engine waste heat amount is minimized (heat efficiency is maximized) at each of the inflection points. Whichever the ignition timing is shifted, to the ignition advance side or to the ignition retard side, from the inflection point, the waste heat amount is increased (heat efficiency is decreased). Further, when the ignition timing is on the ignition retard side with reference to the inflection point, the engine waste heat amount is maximized at the maximally-ignition-retarded timing. When the ignition timing is on the ignition advance side with reference to the inflection point, the engine waste heat amount is maximized at each of the maximally-ignition-advanced timings IG1 to IG4. Regarding L5, there is no inflection point at an intermediate position between the maximally-ignition-advanced timing IG5 and the maximally-ignition-retarded timing. Instead, the engine waste heat amount is minimized at the maximally-ignition-retarded timing and maximized at the maximally-ignition-advanced timing IG5. Comparing the engine waste heat amounts with each other at the maximally-ignition-advanced timings IG1 to IG5, the engine waste heat amount is increased (heat efficiency is decreased) as the overlap angle is decreased.

Referring to FIG. 24, let us discuss the case where a requested heat amount can no longer be satisfied under the engine control in the first control mode. Specifically, let us discuss the case, for example, where a requested heat amount can no longer be satisfied when the overlap angle is controlled to be a reference overlap angle (L2 in the figure) and engine control is performed with an optimum ignition timing (IM2) corresponding to the reference overlap angle. In this case, the engine waste heat amount is increased by switching control mode of the engine from the first to second control mode and performing engine control in the second control mode.

Specifically, as indicated by the dash-dot line in FIG. 24, the overlap angle is changed to the maximally-overlapped angle (L5 in the figure) corresponding to a maximum value in a controllable range. Then, utilizing the ignition timing characteristics L5 in the maximally-overlapped angle, ignition timing is shifted to an ignition advance side with reference to the maximum-efficient timing IM5 in the maximally-overlapped angle, according to a requested heat amount. To explain more about the ignition timing, the ignition timing is corrected to fall on the ignition advance side by an amount corresponding to the sum of a first ignition advance correction amount H1 which is based on the premise of performing ignition timing control at the maximum-efficient timing, and a second ignition advance correction amount H2 for advancing ignition timing from the maximum-efficient timing according to a requested heat amount.

Comparing the engine waste heat amount between the individual overlap angles at the maximally-ignition-advanced timings IG1 to IG5, the engine waste heat amount at the maximally-ignition-advanced timings IG1 to IG5 becomes smaller, as shown in FIG. 24, as the overlap angle becomes larger. Therefore, when the engine waste heat amount is to be increased (when heat efficiency is to be decreased) using the ignition timing characteristics indicated by L5, the engine waste heat suitable for the requested heat amount may not be generated because the ignition timing is restricted by the maximally-ignition-advanced timing IG5.

In this regard, in the present embodiment, additional waste heat control (maximally-ignition-advanced waste heat control) is performed in the second control mode, other than the above control of controlling the overlap angle to the maximally-overlapped angle and shifting the ignition timing to the ignition advance side according to the requested heat amount, with reference to the maximum-efficient timing that corresponds to the maximally-overlapped angle. Specifically, with the additional waste heat control in the second control mode, the overlap angle is controlled to be smaller than the maximally-overlapped angle and the ignition timing is controlled to be the maximally-ignition-advanced timing that corresponds to the overlap angle of the moment. Then, if the heat utilization request cannot be satisfied by the maximally-overlapped waste heat control (if the engine waste heat amount is insufficient) while the second control mode is executed, the engine waste heat is increased by performing the maximally-ignition-advanced waste heat control. In other words, the maximally-overlapped waste heat control and the maximally-ignition-advanced waste heat control are switched in the second control mode, according to the requested heat amount.

Comparing the fuel consumption between the individual overlap angles at the maximally-ignition-advanced timings IG1 to IG5, fuel consumption is decreased (heat efficiency is increased) as the overlap angle is increased and minimized with the maximally-overlapped angle. Accordingly, maximally-overlapped angle in the present embodiment corresponds to maximally-efficient overlap angle with which fuel consumption of the engine 10 is minimized with the ignition timing being the maximally-ignition-advanced timing.

Figure 25:
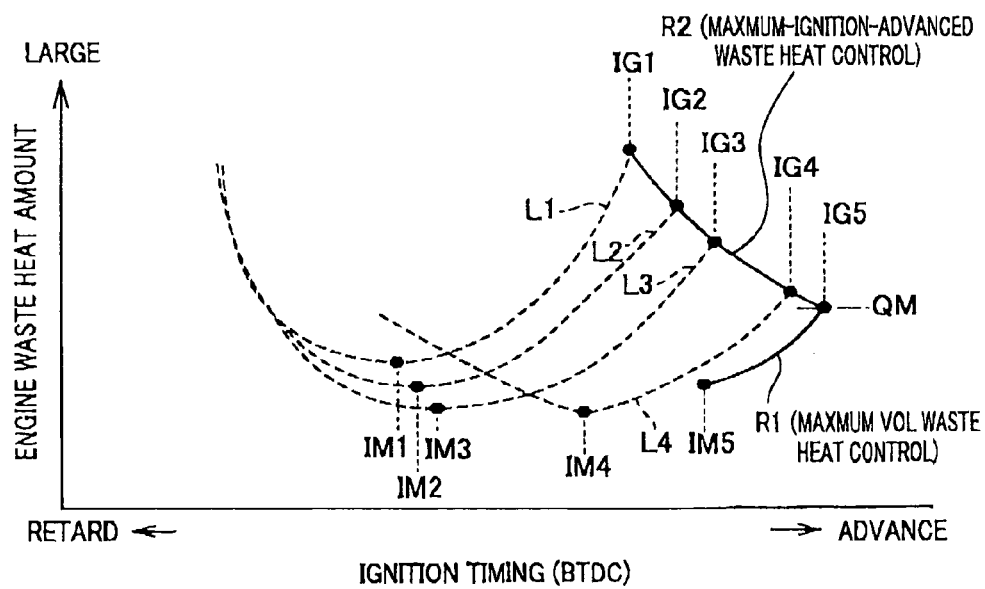
FIG. 25 is a schematic diagram illustrating maximally-overlapped waste heat control and maximally-ignition-advanced waste heat control.

FIG. 25 illustrates general outlines of the maximally-overlapped waste heat control and the maximally-ignition-advanced waste heat control. The engine waste heat control in the second control mode is configured by a maximally-overlapped waste heat control R1 and a maximally-ignition-advanced waste heat control R2. Under the maximally-overlapped waste heat control R1, waste heat control is performed using the ignition timing characteristics with the maximally-overlapped angle. Under the maximally-ignition-advanced waste heat control R2, waste heat control is performed at the maximally-ignition-advanced timing determined for each overlap angle. The maximum value of the engine waste heat amount under the maximally-overlapped waste heat control R1 is compared with the requested heat amount. As a result of the comparison, if the requested heat amount is smaller than or equal to the maximum value, the maximally-overlapped waste heat control R1 is performed. If the requested heat amount is larger than the maximum value, the maximally-ignition-advanced waste heat control R2 is performed. When the engine waste heat amount is to be increased under the maximally-ignition-advanced waste heat control R2, the overlap angle is decreased and the ignition timing is shifted to the ignition retard side, as the requested heat amount becomes larger.

Figure 26:
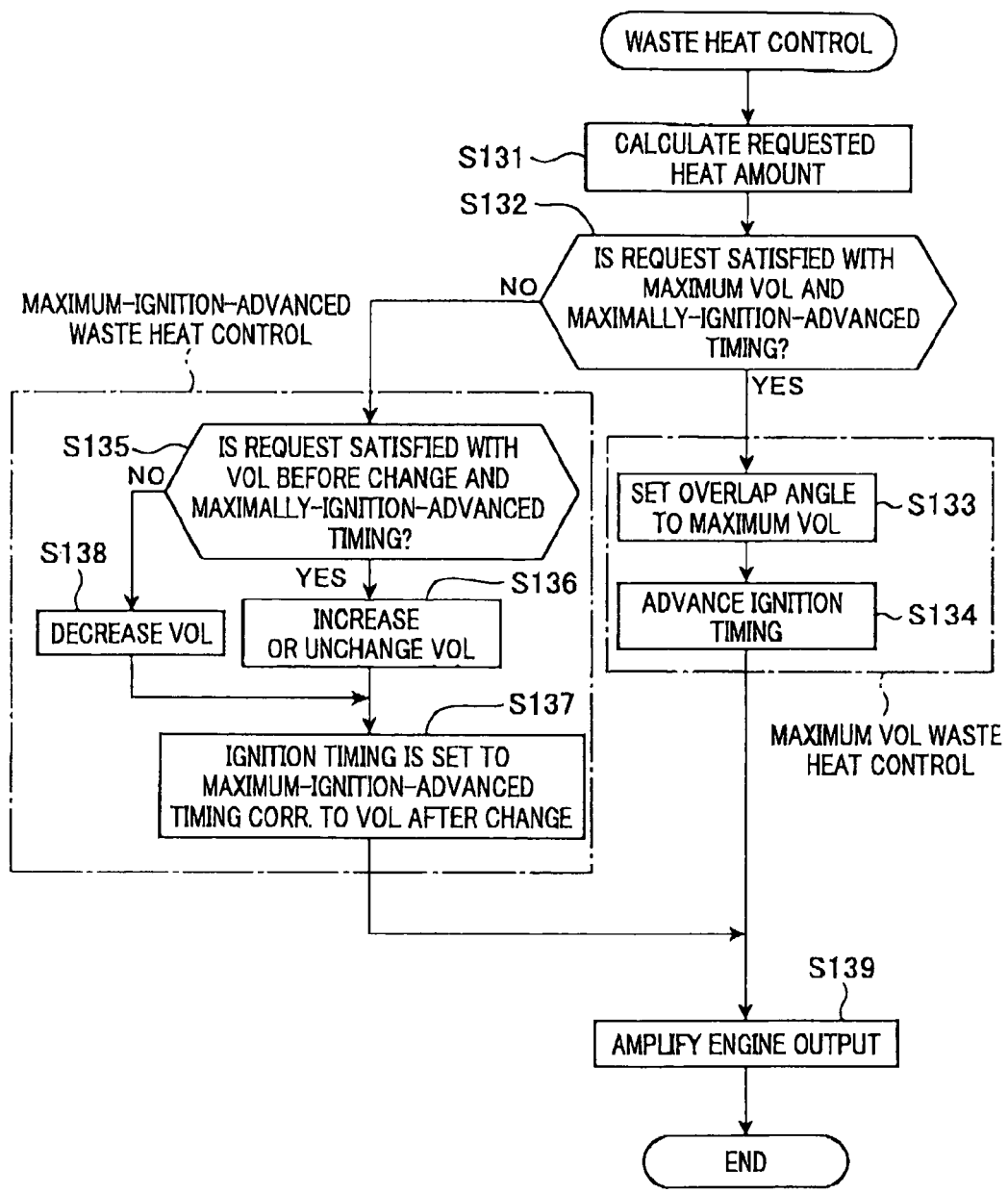
FIG. 26 is a flow diagram illustrating waste heat control in the second control mode.

FIG. 26 is a flow diagram illustrating waste heat control in the second control mode. Processes illustrated in FIG. 26 are repeatedly performed by the ECU 40 at a predetermined cycle in the case where the switching "first control mode→second control mode" is determined to be performed at step S122 and the transition "high-load region→low-load region" is determined to be performed at step S123, in the processes shown in FIG. 23.

In FIG. 26, at step S131, a requested heat amount is calculated as a request value of engine waste heat amount to be generated with the issuance of a heat utilization request. A requested heat amount, if it is caused by a heating request, for example, is calculated based on one or more parameters out of the cooling water temperature Tw or the cooling water flow rate, the rotational speed of the blower fan, the outside air mix rate, the outside air temperature, the set temperature of the air conditioner, the blowing temperature of the air conditioner, and the like. At step S132, a comparison is made between a requested heat amount of the moment and a waste heat amount that can be generated at the maximally-ignition-advanced timing with the overlap angle being maximized (overlap maximum heat amount, which is indicated by QM in FIG. 25). If the requested heat amount is equal to or smaller than the overlap maximum heat amount QM, the processes at steps S133 and S134 are performed as the maximally-overlapped waste heat control. If the requested heat amount is larger than the overlap maximum heat amount QM, the processes at steps S135 to S138 are performed as the maximally-ignition-advanced waste heat control.

Specifically, at step S133, the maximally-overlapped waste heat control is performed to set the overlap angle to a maximum value VMAX. At step S136, the ignition timing of the moment is set so as to fall on the ignition advance side by an amount corresponding to the sum of the ignition advance correction amount H1 and the ignition advance correction amount H2 (H1+H2). With the ignition advance correction amount H1, the ignition timing is advanced from the maximum-efficient timing before the increase of the overlap angle to the maximum-efficient timing after the increase of the overlap angle. With the ignition advance correction amount H2, the ignition timing is advanced from the maximum-efficient timing according to a requested heat amount, with the increased overlap angle. Thus, the overlap angle is changed to the maximum value VMAX under the valve timing control performed through a different routine, not shown, while the ignition timing is shifted to the ignition advance side by an amount corresponding to the correction amount (H1+H2) under the ignition timing control performed through a different routine, not shown.

Figure 27:
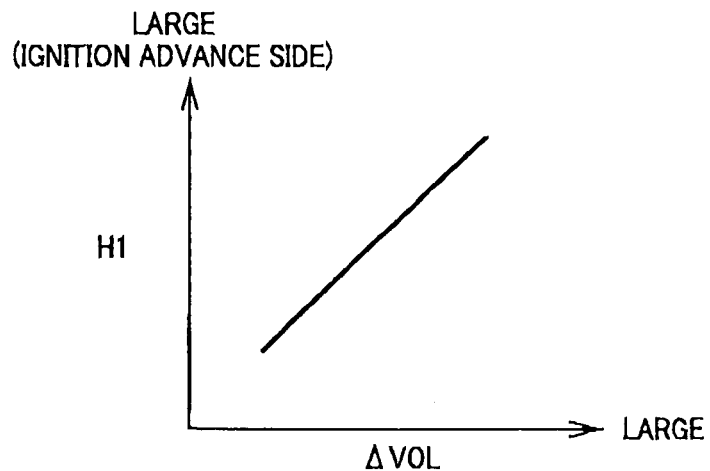
FIG. 27 is an explanatory diagram illustrating a first ignition advance correction amount.
Figure 28:
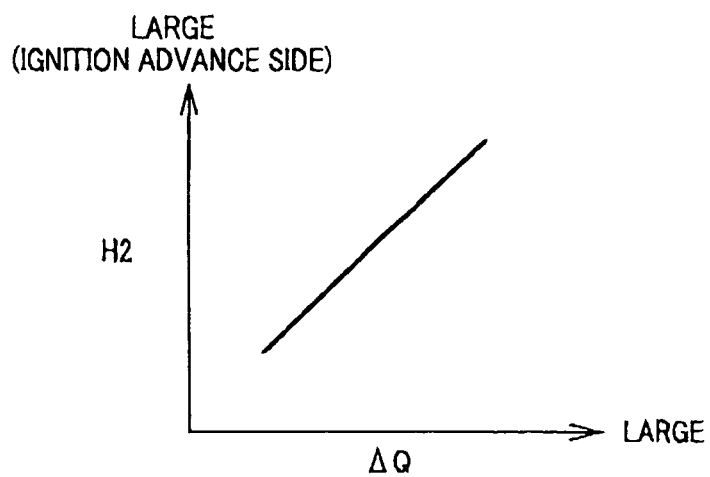
FIG. 28 is an explanatory diagram illustrating a second ignition advance correction amount.

Of the ignition timing corrections, the ignition advance correction amount H1 is set to a large value, as shown in FIG. 27, so that the ignition advance amount is increased as a change amount $\Delta$VOL of the overlap angle in an increasing manner becomes larger. As shown in FIG. 28, the ignition advance correction amount H2 is set to a large value so that the ignition advance amount is increased as a difference $\Delta$Q between the waste heat amount and the requested heat amount under the engine control of the moment becomes larger, i.e. as the increase of the heat amount becomes larger.

Figure 29:
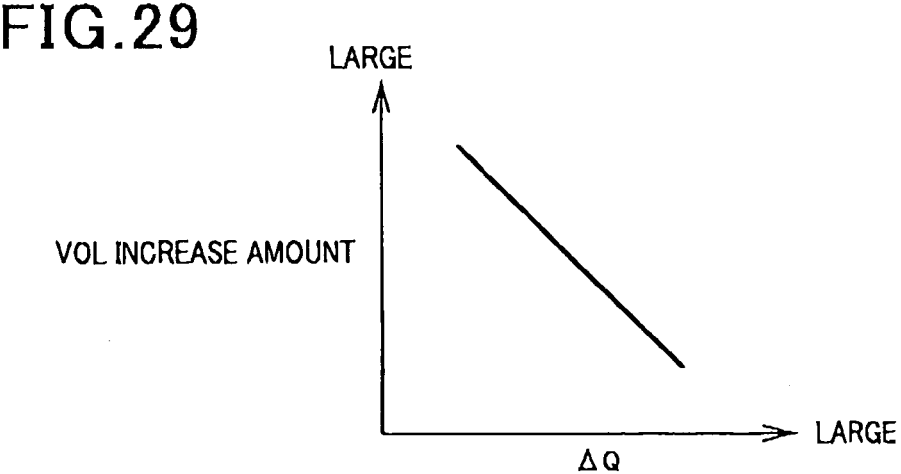
FIG. 29 is a diagram illustrating increase in the overlap under maximally-ignition-advanced waste heat control.

At step S135, the maximally-ignition-advanced waste heat control is performed to make a comparison between an engine waste heat amount (maximally-ignition-advanced heat amount) at the maximum ignition timing and a requested heat amount. The engine waste heat amount here corresponds to the overlap angle before the increase of heat amount. If the requested heat amount is smaller than the maximally-ignition-advanced heat amount and the maximally-ignition-advanced heat amount can satisfy the requested heat amount, the overlap angle is increased, at step S136, in order to maximize the effect of suppressing deterioration in the fuel consumption. At the same time, at step S37, the ignition timing is set to a maximally-ignition-advanced timing which corresponds to the increased overlap angle. In this case, as shown in FIG. 29, for example, the change amount for the overlap angle of the moment is decreased as the heat amount $\Delta$Q to be increased (difference between the engine waste heat amount of the moment and the requested heat amount) becomes larger.

Figure 30:
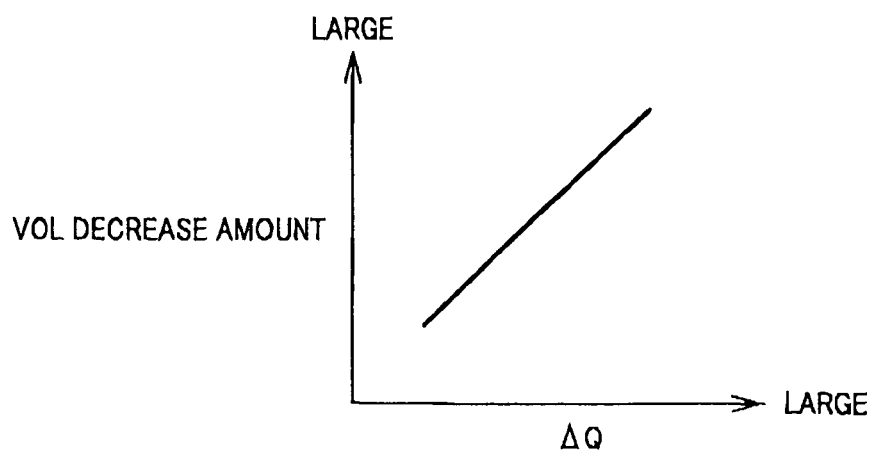
FIG. 30 is a diagram illustrating decrease in the overlap under maximally-ignition-advanced waste heat control.

On the other hand, if the requested heat amount is larger than the maximally-ignition-advanced heat amount, the overlap angle is decreased, at step S138. At the same time, at step S137, the ignition timing is set to a maximally-ignition-advanced timing that corresponds to the decreased overlap angle. In this case, as shown in FIG. 30, for example, the change amount for the overlap angle of the moment is increased as the heat amount $\Delta$Q to be increased becomes larger. In this way, waste heat amount is ensured to be increased while deterioration in the fuel consumption is suppressed as much as possible.

Finally, at step S139, an engine output augmentation process is performed. The engine output augmentation process is a process for augmenting the engine output that has been lowered under the waste heat control if it has been performed as described above. In this process, a correction for increasing fuel injection quantity or a correction of increasing air amount (throttle opening) is appropriately performed. Then, the present procedure is ended.

In the third embodiment described above as well, waste heat control suitable for a heat utilization request can be performed similar to the first and second embodiments described above. Moreover, the shock or the like can be mitigated when control is switched with the change of a requested heat amount. Thus, improvement in the drivability can be achieved.

In particular, it has been so configured that, in at least one of the multiple control modes, the overlap angle is changed in an increasing manner and the heat efficiency is decreased (waste heat amount is increased) by shifting the ignition timing to the ignition advance side with reference to the maximum-efficient timing (MBT or near MBT) after the increase of the overlap angle. More specifically, it has been so configured that the relationship of the overlap angle with the maximum-efficient timing and the maximally-ignition-advanced timing of the ignition timing is predetermined, and that the engine heat efficiency is decreased (waste heat amount is increased) by controlling the overlap angle to the maximally-efficient overlap angle (maximally-overlapped angle) that minimizes the fuel consumption of the engine 10 when the ignition timing falls on the maximally-ignition-advanced timing and by controlling the ignition timing to fall on the ignition advance side, according to a requested heat amount, with reference to the maximum-efficient timing with the maximally-overlapped angle. Thus, waste heat control suitable for a heat utilization request can be performed, while deterioration in the fuel consumption can be suppressed as much as possible.

Further, the second control mode has been configured by the maximally-overlapped waste heat control and the maximally-ignition-advanced waste heat control. Specifically, under the maximally-overlapped waste heat control, the overlap angle has been set to a maximum value and the ignition timing has been controlled to fall on the ignition advance side with reference to the maximum-efficient timing that corresponds to the maximally-overlapped angle. Under the maximally-ignition-advanced waste heat control, the overlap angle has been controlled to be an overlap angle smaller than a maximally-efficient overlap angle and the ignition timing has been controlled at the maximally-advanced ignition timing corresponding to the overlap angle of the moment. Thus, it has been so configured that, in executing the second control mode, if a requested heat amount can be satisfied by the heat generation under the maximally-overlapped waste heat control, waste heat control is performed under the maximally-overlapped waste heat control, and that, if a requested heat amount cannot be satisfied by the heat generation under the maximally-overlapped waste heat control, waste heat control is performed under the maximally-ignition-advanced waste heat control. In this way, waste heat control can be performed with optimum fuel consumption under the maximally-overlapped waste heat control. At the same time, if a requested heat amount cannot be satisfied under the maximally-overlapped waste heat control, the requested heat amount can be satisfied under the maximally-ignition-advanced waste heat control, while decrease in the heat efficiency (deterioration in the fuel-consumption performance) can be suppressed as much as possible. Accordingly, suppression of deterioration in the fuel consumption can be well balanced with a heat utilization request by switching control between the maximally-overlapped waste heat control and the maximally-ignition-advanced waste heat control.

Other Embodiments

The present invention is not limited to the contents of the embodiments described above, but may be implemented, for example, as set forth below.

It may be so configured that, in a hybrid vehicle having an engine and an electric motor as drive sources, control mode is switched in the case where the output ratio of the engine to the electric motor is equal to or less than a predetermined ratio. Applying this configuration to the flow diagram of FIG. 19, the above condition may be added to the mode switching performing conditions at steps S116 to S118. In a hybrid vehicle having an engine and an electric motor as drive sources, the influence of torque variation in the engine, if it occurs, will be less if the output ratio of the engine to the electric motor is low. Therefore, when the output ratio of an engine to an electric motor is equal to or less than a predetermined ratio, favorable control mode switching can be realized.

In the above embodiments, a controlled variable map has been prepared to calculate an engine controlled variable for every control mode to thereby provide a configuration in which multiple control modes can be realized. However, this configuration may be modified. In the modified configuration, for example, a map of reference controlled variable may be shared between the modes and a different correction may be given to each control mode based on the reference controlled variable. With this modified configuration as well, multiple control modes having different engine heat efficiency characteristics can be realized.

A configuration has been disclosed in which waste heat amount is increased by retarding ignition timing of an engine, by opening intake valve at an earlier occasion, and by opening exhaust valve at a later occasion to perform engine control for differentiating engine heat efficiency characteristics. However, a different configuration may be used. For example, engine heat efficiency may be decreased (waste heat amount may be increased) by excessively advancing the ignition timing in a region that allows for knock. Alternatively, engine heat efficiency may be decreased (waste heat amount is increased) by increasing/decreasing an EGR gas amount (external EGR amount) using an EGR system. Alternatively, engine heat efficiency may be decreased (waste heat amount is increased) by controlling the engine intake flow. To explain specifically regarding the intake flow control, the waste heat amount of the engine 10 may be regulated by controlling the opening of a TCV (tumble control valve) or an SCV (swirl control valve) provided at an intake pipe. Further, it may be so configured that engine heat efficiency is decreased (waste heat amount is increased) by performing flow control using an electric water pump.

Control other than engine control may be adopted as control means, under which engine heat efficiency characteristics are differentiated. For example, engine heat efficiency characteristics may be changed by performing shift control of the automatic transmission. In this case, multiple control modes may be provided as the shift control of the automatic transmission. Alternatively, engine heat efficiency characteristics may be changed by performing oversupply pressure control of a turbocharger. Alternatively, engine heat efficiency characteristics may be changed by performing flow control of an intercooler. Such configurations are applicable to an engine system having a diesel engine.

Temperature conditions, such as outside air temperature and vehicle cabin temperature, may be included in the conditions for switching control mode. For example, control mode may be switched when any one of the following conditions is met: outside air temperature being equal to or less than a predetermined value and the difference between the outside air temperature and the vehicle cabin temperature being equal to or less than a predetermined value (vehicle cabin temperature—outside air temperature predetermined value); the difference between a target vehicle cabin temperature and actual vehicle cabin temperature being equal to or more than a predetermined value (target vehicle cabin temperature—actual vehicle cabin temperature≤predetermined value); and either outside air temperature or vehicle cabin temperature is equal to or less than a predetermined value and time passed from engine start being within a predetermined period of time. With the inclusion of temperature conditions, air conditioning, such as heating, can be appropriately performed to thereby improve comfort.

Other than a heating request and a catalyst warm-up request, heat utilization requests include a temperature rise request for on-vehicle parts, such as a temperature rise request for an on-vehicle battery. For example, in the case where a high-voltage battery as a power-supply unit is installed in a vehicle, for use for a motor that allows the vehicle to travel, the high-voltage battery may be kept at a predetermined temperature in order to stabilize power supply of the battery. In this case, a temperature rise request for battery is issued as a heat utilization request when the outside air temperature becomes low while the vehicle travels at nighttime or in winter. In response to the temperature rise request for battery, engine control or the like is performed in any one of the control modes.

The first embodiment described above may be configured such that, as at least any one of the multiple control modes, the overlap angle control and the ignition advance control are performed to decrease heat efficiency (increase waste heat amount). In this case, under the overlap angle control, the overlap angle is changed when the valve opening period of an intake valve overlaps with the valve opening period of an exhaust valve, and under the ignition advance control, the ignition timing is advanced with the ignition timing control. For example, the first embodiment described above may be configured such that at least either one of the second and third control modes is used for performing the overlap angle control and the ignition advance control, or for performing waste heat control under the maximally-overlapped waste heat control and the maximally-ignition-advanced waste heat control of the third embodiment described above. Thus, engine heat efficiency can be suppressed from being deteriorated as much as possible in increasing waste heat, and in addition, fuel consumption can be suppressed from being deteriorated.

In the fifth embodiment described above, it may be determined that whether or not there is an ignition advance margin in which ignition timing is controlled to fall on an ignition advance side with reference to maximum-efficient timing (MBT or near MBT). If it is determined that there is an ignition advance margin, waste heat control may be performed under valve overlap angle control+ignition advance control in the second control mode. On the other hand, if there is no ignition advance margin, the overlap angle may be changed in an increasing manner in the second control mode, and the ignition timing may be shifted to an ignition retard side with reference to the maximum-efficient timing with the overlap angle that has been changed in an increasing manner.

When ignition timing is on an ignition retard side with reference to an MBT, waste heat amount will be increased as the ignition timing is more retarded. The inventors have found that, when ignition timing is on an ignition retard side with reference to an MBT, fuel consumption is more improved as the overlap angle is increased, similar to the case where ignition timing is on an ignition advance side. Accordingly, with the above configuration, deterioration in the engine heat efficiency accompanying the increase of engine waste heat amount can be suppressed as much as possible even when there is no ignition advance margin for ignition timing.

Deterioration in fuel consumption accompanying the increase of engine waste heat amount can be more suppressed by shifting the ignition timing to an ignition advance side than to an ignition retard side with reference to an MBT. In light with this point, it may be so configured that waste heat amount is not increased if there is no ignition advance margin in a configuration in which waste heat control is performed according to the ignition advance margin for ignition timing. In other words, when a heat utilization request is issued, control mode may be switched from the first to second control mode only when there is an ignition advance margin for ignition timing. In this case, mode switching may be performed at the timing when the engine driving condition is transited from a high-load region to a low-load region.

Regarding the fifth embodiment described above, if, in the second control mode, engine waste heat amount is insufficient under valve overlap angle control+ignition advance control, i.e. if engine waste heat amount suitable for the requested heat amount cannot be obtained in spite of the shifting of the ignition timing to the maximally-ignition-advanced timing that corresponds to each valve overlap angle, waste heat control may be performed by shifting the ignition timing to an ignition retard side with reference to the MBT. In this case, when the requested heat amount cannot be satisfied, the overlap angle may be changed in an increasing manner and the ignition timing may be shifted to an ignition retard side with reference to the maximum-efficient timing with the overlap angle after being changed in an increasing manner. This configuration is effective when the maximum value of an engine waste heat amount recoverable when ignition timing is shifted to an ignition retard side with reference to the MBT is larger than the maximum value in the case where the ignition timing is shifted to an ignition advance side.

In the case where waste heat is increased in the second control mode of the fifth embodiment described above, generated heat amount may be gradually increased under the maximally-overlapped waste heat control or the maximally-ignition-advanced waste heat control to thereby increase the engine waste heat amount up to a heat amount suitable for the heat utilization request (heat amount that should be ultimately generated). In other words, generated heat amount may be gradually increased using the ignition timing characteristics (R1) with the maximally-overlapped angle, and the ignition timing characteristics (R2) at the maximally-ignition-advanced timing that correspond to each overlap angle.

Under the maximally-overlapped waste heat control of the fifth embodiment described above, engine waste heat amount has been ensured to be increased by rendering the overlap angle to be the maximum value VMAX and shifting the ignition timing to the ignition advance side with reference to the maximum-efficient timing. However, the overlap angle may be smaller than the maximum value VMAX if only the value of the overlap angle indicates increase compared to that prior to the increase of the heat amount.

The fifth embodiment described above has been configured such that engine waste heat amount is increased, in the second control mode, under the maximally-overlapped waste heat control and the maximally-ignition-advanced waste heat control. However, engine waste heat amount may be increased by performing only either one of the maximally-overlapped waste heat control and the maximally-ignition-advanced waste heat control.

Figure 10:
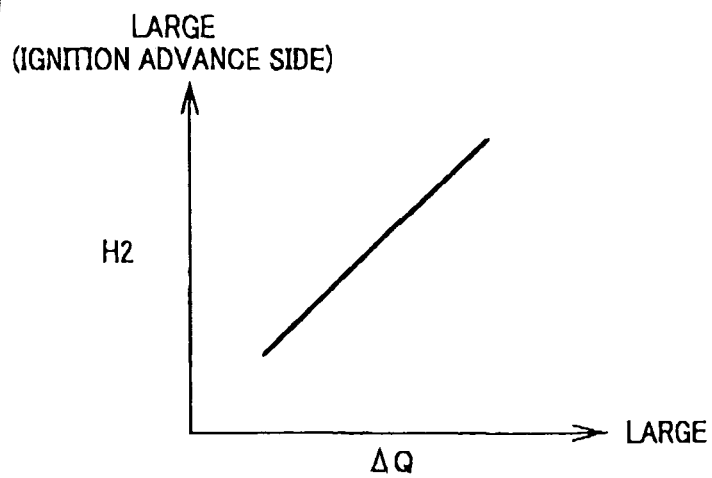
FIG. 10 is an explanatory diagram illustrating a second ignition advance correction amount H2.

In the description referring to FIGS. 10 and 11, a valve overlap angle has been change in the waste heat control by controlling the valve-opening period of the exhaust valve using the exhaust-side valve actuation mechanism 19. Alternatively, however, the valve overlap angle may be ensured to be changed by changing the valve-opening period of the intake valve using the valve actuation mechanism 18. Alternatively, the valve overlap angle may be ensured to be changed by controlling the valve-opening period of the intake valve and the valve-opening period of the exhaust valve using the valve actuation mechanisms 18 and 19.

What is claimed is:

1. An apparatus for controlling an amount of waste heat of an engine based on a requested heat amount of a heat utilization request, the apparatus being applied to a waste heat reuse system that recovers and reuses waste heat of an engine, the apparatus comprising:

overlap angle control means for controlling an overlap angle between a valve-opening period of an intake valve and a valve-opening period of an exhaust valve of the engine based on an engine driving condition;

ignition timing control means for controlling ignition timing of the engine at maximum-efficient timing when minimum fuel consumption is achieved in each engine driving condition; and waste heat control means for performing overlap-increase control under which the overlap angle is increased and ignition advance control under which the ignition timing is shifted to an ignition advance side with reference to the maximum-efficient timing that corresponds to the overlap angle after being increased, in the case where the requested heat amount cannot be satisfied.

2. The apparatus according to claim 1, wherein:
the waste heat control means is configured to control, as the overlap-increase control, the overlap angle to an overlap angle with which fuel consumption of the engine at ignition timing that satisfies a predetermined engine waste heat amount in ignition timing characteristics of each overlap angle is made smaller than fuel consumption before increase of overlap angle, and control, as the ignition advance control, the ignition timing according to the requested heat amount so as to fall on an ignition advance side with reference to the maximum-efficient timing that corresponds to the overlap angle after being changed in an increasing manner.

3. The apparatus according to claim 1, wherein:
the waste heat control means is configured to control, as the overlap-increase control, the overlap angle to an overlap angle with which fuel consumption of the engine at maximally-ignition-advanced timing in ignition timing characteristics of each overlap angle is made smaller than fuel consumption before increase of an overlap angle.

4. The apparatus according to claim 1, wherein:
the waste heat control means is configured to control, as the overlap-increase control, the overlap angle to an overlap angle with which a waste heat amount of the engine at maximally-ignition-advanced timing in ignition timing characteristics of each overlap angle is made smaller than a waste heat amount before increase of an overlap angle.

5. The apparatus according to claim 1, wherein:
the waste heat control means is configured to control, as the ignition advance control, the ignition timing based on a first ignition timing correction amount for advancing the ignition timing from maximum-efficient timing before an increase in an overlap angle to maximum-efficient timing after increase of an overlap angle, and a second ignition timing correction amount for advancing the ignition timing from the maximum-efficient timing that corresponds to an overlap angle after being increased, according to the requested heat amount.

6. The apparatus according to claim 1, wherein:
the waste heat control means is configured to change, as the overlap-increase control, the overlap angle to a maximally-overlapped angle having a maximum value in a range that can be set, and controls, as the ignition advance control, the ignition timing according to the requested heat amount so as to fall on an ignition advance side with reference to the maximum-efficient timing that corresponds to the maximally-overlapped angle.

7. The apparatus according to claim 1, wherein:
the waste heat control means comprises:
first control means for controlling, as the overlap-increase control, the overlap angle to a maximally-efficient overlap angle that minimizes fuel consumption of the engine in the case where the ignition timing is permitted to fall on maximally-ignition-advanced timing that is an ignition advance limit, and controlling, as the ignition advance control, the ignition timing according to the requested heat amount so as to fall on an ignition advance side with reference to maximum-efficient timing that corresponds to the maximally-efficient overlap angle,
second control means for controlling the overlap angle to an overlap angle smaller than the maximally-efficient overlap angle, and controlling the ignition timing so as to fall on maximally-ignition-advanced timing that corresponds to an overlap angle after being changed; and
switching means for performing switching between waste heat control performed by the first control means and waste heat control performed by the second control means, based on the requested heat amount.

8. The apparatus according to claim 7, wherein:
the switching means is configured to perform the waste heat control with the first control means in the case where the requested heat amount can be satisfied by heat generation of the first control means, and to perform the waste heat control with the second control means in a case where the requested heat amount cannot be satisfied by heat generation of the first control means.

9. The apparatus according to claim 7, wherein:
the second control means is configured to allow the overlap angle to be smaller as the requested heat amount becomes larger.

10. The apparatus according to claim 7, wherein:
the second control means is configured to set the ignition timing more on an ignition retard side as the requested heat amount becomes larger.

11. The apparatus according to claim 1, comprising:
ignition advance margin determining means for determining whether or not there is an ignition advance margin in which the ignition timing is controlled to fall on an ignition advance side with reference to the maximum-efficient timing, wherein
the waste heat control means, when the requested heat amount cannot be satisfied, is configured to perform waste heat control with the waste heat control means in a case where an ignition advance margin for the ignition timing is determined to be present by the ignition advance margin determining means, and to change the overlap angle in an increasing manner, and to shift the ignition timing to an ignition retard side with reference to the maximum-efficient timing in a case where no ignition advance margin is determined to be present by the ignition advance margin determining means.

12. An apparatus for controlling an amount of waste heat of an engine based on a heat utilization request, the apparatus being applied to a waste heat reuse system that reuses waste heat of an engine, the apparatus comprising:
waste heat control means for controlling the waste heat, in which multiple control modes are set with different heat efficiency characteristics of an engine being imparted thereto; and
mode switching means for delaying switching of the control modes for issuance timing or cancellation timing of the heat utilization request in switching the control modes, so that a waste heat amount of the engine is increased or decreased based on the heat utilization request.

13. The apparatus according to claim 12, wherein:
heat efficiency characteristics of the multiple control modes are set for each operating region of an engine; and
the mode switching means is configured to perform switching of the control modes in an operating region of an engine, in which region the heat efficiency characteristics remain the same or substantially remain unchanged before and after switching of the control modes.

14. The apparatus according to claim 13, wherein:
heat efficiency characteristics of two or more control modes are permitted to be the same in any one of the operating regions of an engine; and
the mode switching means is configured to perform switching of the control modes between control modes having the same heat efficiency characteristics, in an operating region where heat efficiency characteristics of two or more control modes become the same after issuance or cancellation of the heat utilization request.

15. The apparatus according to claim 14, wherein:
heat efficiency characteristics of two or more control modes of the multiple control modes are the same in a high-load region of an engine; and
the mode switching means is configured to perform switching of the control modes in the case where an engine driving condition resides in the high-load region.

16. The apparatus according to claim 13, wherein:
a first operating region provided as an execution region for one control mode of the multiple control modes, and a second operating region provided as an execution region for two or more control modes of the multiple control modes are set as operating regions adjacent to each other; and
the mode switching means is configured to perform switching of the control modes according to the heat utilization request at timing when an engine driving condition is transited from the first operating region to the second operating region or at timing when an engine driving condition is transited from the second operating region to the first operating region, after issuance or cancellation of the heat utilization request.

17. The apparatus according to claim 16, wherein:
a high-load region of the engine is the first operating region and a region where load is lower than in the high-load region is the second operation region.

18. The apparatus according to claim 12, comprising:
overlap angle control means for controlling an overlap angle between a valve-opening period of an intake valve and a valve-opening period of an exhaust valve of the engine based on an engine driving condition; and
ignition control means for controlling ignition timing of the engine at maximum-efficient timing that minimizes fuel consumption in each engine driving condition,
wherein
the waste heat control means is configured to perform overlap-increase control under which the overlap angle is changed in an increasing manner and ignition advance control under which the ignition timing is shifted to an ignition advance side with reference to the maximum-efficient timing that corresponds to the overlap angle after being changed in an increasing manner, in at least any one of the multiple control modes.

19. The apparatus according to claim 18, wherein:
the waste heat control means comprises:
first control means for controlling, as the overlap-increase control, the overlap angle to a maximally-efficient overlap angle that minimizes fuel consumption of the engine in the case where the ignition timing is permitted to fall on maximum ignition advance timing that is an ignition advance limit, and controlling, as the ignition advance control, the ignition timing so as to fall on an ignition advance side with reference to maximum-efficient timing that corresponds to the maximally-efficient overlap angle, according to a requested heat amount of the heat utilization request; and
second control means for controlling the overlap angle to an overlap angle smaller than the maximally-efficient overlap angle, and controlling the ignition timing so as to fall on maximally-ignition-advanced timing that corresponds to an overlap angle after being changed,
and
the first control means and the second control means are configured to be switched according to the requested heat amount in one control mode which is at least any one of the multiple control modes.

20. The apparatus according to claim 12, wherein:
the mode switching means is configured to perform switching of the control modes in the case where fuel combustion of the engine is temporarily stopped.

21. The apparatus according to claim 12, wherein:
the apparatus is applied to a vehicle having the engine and an electric motor as drive sources; and
the mode switching means is configured to perform switching between the control modes in a case where an output ratio of the engine to the electric motor is equal to or less than a predetermined value.

22. The apparatus according to claim 12, wherein:
the mode switching means is configured to perform switching between the control modes in any one of the case where the vehicle installed with the engine is either in an accelerated or decelerated state, a case where an automatic transmission linked to an output shaft of the engine is in a transmission operation, and a case where a lockup mechanism provided between the engine and the automatic transmission is in a lockup-off state.

* * * * *